(12) United States Patent
Element

(10) Patent No.: US 9,696,693 B2
(45) Date of Patent: Jul. 4, 2017

(54) APPARATUS AND SYSTEM FOR CONTROLLING WINDOW COVERINGS TO ADJUST ADMITTED DAYLIGHT

(75) Inventor: Richard Geraint Element, Castleton (CA)

(73) Assignee: Richard Geraint Element, Castleton, ON (CA)

( * ) Notice: Subject to any disclaimer, the term of this patent is extended or adjusted under 35 U.S.C. 154(b) by 391 days.

(21) Appl. No.: 14/236,927

(22) PCT Filed: Aug. 6, 2012

(86) PCT No.: PCT/CA2012/000745
§ 371 (c)(1),
(2), (4) Date: Feb. 4, 2014

(87) PCT Pub. No.: WO2013/020214
PCT Pub. Date: Feb. 14, 2013

(65) Prior Publication Data
US 2014/0163742 A1 Jun. 12, 2014

Related U.S. Application Data

(60) Provisional application No. 61/515,588, filed on Aug. 5, 2011.

(51) Int. Cl.
*G05B 11/01* (2006.01)
*E06B 9/32* (2006.01)
(Continued)

(52) U.S. Cl.
CPC ............... *G05B 11/01* (2013.01); *E06B 9/32* (2013.01); *E06B 9/322* (2013.01); *G05B 15/02* (2013.01);
(Continued)

(58) Field of Classification Search
None
See application file for complete search history.

(56) References Cited

U.S. PATENT DOCUMENTS

2003/0098133 A1* 5/2003 Palmer .................... E06B 9/68
160/310
2003/0107888 A1* 6/2003 Devlin .................... F21V 21/15
362/233
(Continued)

FOREIGN PATENT DOCUMENTS

| EP | 0210049 A2 | 1/1987 |
|---|---|---|
| JP | 2000303760 A | 10/2000 |
| JP | 2007101501 A | 4/2007 |
| KR | 2000006591 A1 | 11/2000 |

OTHER PUBLICATIONS

WIPO, International Search Report and Written Opinion for PCT Application No. PCT/CA2012/000745 dated Jan. 21, 2013.

*Primary Examiner* — Tuan Dao
(74) *Attorney, Agent, or Firm* — Norton Rose Fulbright Canada LLP; Niall Cooney

(57) ABSTRACT

The present invention is an apparatus, system, method, computer program, and computer program product for controlling window coverings to adjust admitted daylight. More particularly, the present disclosure plates to a control system for controlling the amount of daylight admitted through adjustable window coverings. In an embodiment of the present invention, the system includes a stand-alone open loop proportional control subsystem including a calculation or algorithm that is operable to convert a sunlight sensor signal to a blind slat position based on a predetermined curve stored in memory. In another embodiment of the present invention, the system is operable to transmit the sunlight sensor information, for example, such as in Lux, to an external system, which may then provide blind slat position
(Continued)

requests based on some other curve, algorithm, or user need. The blind slat position may be controlled by the system to avert undesirable solar heat gains and also achieve significant daylight harvesting.

21 Claims, 16 Drawing Sheets

(51) Int. Cl.
E06B 9/322 (2006.01)
G05B 15/02 (2006.01)
H04L 12/28 (2006.01)
H04L 12/403 (2006.01)

(52) U.S. Cl.
CPC ........ *H04L 12/2829* (2013.01); *H04L 12/403* (2013.01); *G05B 2219/163* (2013.01); *G05B 2219/2653* (2013.01); *H04L 2012/285* (2013.01)

(56) References Cited

U.S. PATENT DOCUMENTS

| | | | | |
|---|---|---|---|---|
| 2003/0145956 | A1* | 8/2003 | Domel | G08C 19/28 160/168.1 R |
| 2004/0177933 | A1* | 9/2004 | Hillman | E06B 9/322 160/170 |
| 2006/0283560 | A1* | 12/2006 | Lai | E06B 9/303 160/168.1 R |
| 2007/0277939 | A1* | 12/2007 | Miller | E06B 9/581 160/133 |
| 2008/0216966 | A1* | 9/2008 | Ben-David | E06B 9/264 160/167 R |
| 2009/0020233 | A1* | 1/2009 | Berman | E06B 9/32 160/5 |
| 2010/0298957 | A1* | 11/2010 | Sanchez Rocha | G05B 15/02 700/90 |
| 2011/0265851 | A1* | 11/2011 | Berezhnyy | E06B 9/24 136/245 |

\* cited by examiner

APPARATUS AND SYSTEM FOR CONTROLLING WINDOW COVERINGS TO ADJUST ADMITTED DAYLIGHT

FIELD OF THE INVENTION

The present invention relates generally to an apparatus and system for controlling window coverings to adjust admitted daylight, and more particularly to a control system for controlling the amount of daylight admitted through adjustable window coverings.

BACKGROUND OF THE INVENTION

Numerous studies and publications have shown the benefits of automating window coverings and, in particular, it is well known that automated window coverings can greatly improve the energy efficiency of commercial buildings by reducing heating and cooling loads. These benefits can also extend to residential applications with the added benefits of enhanced security and convenience. The benefits of daylighting control, whereby daylight is harvested and augmented by artificial lighting when necessary are also known. However, the benefits of daylighting control systems have been shown to be highly dependent upon the efficacy of an automated window covering system that works in tandem with the daylighting control system.

Despite numerous designs and strategies that have been introduced at points in time over many decades, automated window coverings have not been implemented and installed in quantities that are commensurate with the perceived benefits of automated window coverings. This is due in large part to the limitations and relative high cost of existing, known prior art automated window covering designs. As an example, typically prior art automated window covering designs that provide the required robustness of design and functionality to achieve benefits are too expensive. The high cost of such automated window covering designs mean that they are unlikely to be implemented, due to the fact that a reasonable payback period cannot be achieved.

In general, there are two recognized types of window coverings: (i) roll shades (also known as rollershades), whereby a fabric is rolled around a motorized tube that when activated causes the fabric to ascend or descend covering a certain portion of the window completely; and (ii) slat based window covering devices, such as shutters and venetian blinds where actuation of an installed motor causes tilting of the slats to a particular desired angle. Some venetian systems may be motorized to achieve a lift function of the entire blind as well.

Rollershades are frequently considered less desirable for sunlight control or daylight harvesting than slat based window covering devices. Unlike slat based window coverings the transmissivity of the window cannot be evenly altered from 0 to 100% over the entire window surface when a rollershade is installed as a window covering. An installed rollershade renders a segment of the window, from top to bottom, opaque or virtually opaque (depending on the material from which the rollershade is formed). A rollershade that renders a segment of the window opaque has the result of creating 0% transmissivity for the covered portion of the window that is rendered opaque or virtually opaque, whereas the remainder of the window that is uncovered, and therefore not rendered opaque, remains in a state that is untreated and that has the result of 100% transmissivity.

The variance of transmissivity levels in a window that is covered partially by a rollershade can create an undesirable situation. For example, a rollershade that covers the upper portion of a window and therefore renders the upper portion of the window opaque or virtually opaque may leave a bottom portion, or segment, of the window uncovered and therefore the bottom portion may not be opaque. The result may be that full sunlight streams unimpeded through the bottom portion of a window despite the fact that the rollershade has been dropped to cover the majority of the window. This can lead to undesirable solar heat gains occurring through the uncovered portion of the window. Such a window covering may further cause a loss of opportunity for daylight harvesting through the covered portion of the window.

Slat based window covering devices, such as shutters and venetian blinds, may provide significantly increased flexibility for controlling the admittance of light more evenly over the entire window surface that rollershades.

Tilt only slat based systems may also provide a significantly simpler position control algorithm. Some complex tilt and lift systems for slat based blinds or shutters may contain dual motorization and control packages to perform the two disparate tasks of tilting and lifting. The lift function of such systems may add a significant cost to the system, and this cost may not be justified as it may not be commensurate with any payback or return on the investment in the installation of a tilt and lift system that is realized through the reduction of a building's energy consumption due to the installation of such a system.

Simpler control systems may contain no position feedback information. Such systems may rely solely on a user to time the energization of a motor until the desired slat rotation position is achieved. More complex control systems may utilize rotary encoders utilizing optical interrupters and opto-couplers. A significant drawback of such prior art systems is that they typically require calibration in situ, as well as periodic recalibration. Such systems may also suffer from drift.

Prior art systems may experience a loss of positional information during a power outage. Such prior art systems may require either battery backup, non-volatile memory, or recalibration upon powerup. Typically such systems may remain powered on constantly.

For example, prior automated window covering systems, such as that described in U.S. Pat. No. 7,417,397, attempt to implement complex control algorithms that determine a roll shade position based on the time of year, geographical location, and orientation. Such systems are complex, and are often too expensive for home automation.

There are further drawbacks to prior art automated window covering systems which also attribute to the lack of widespread installation of such systems. One such drawback is that the efficacy of prior art automated window covering systems can be easily defeated. For example, prior art automated window covering systems may be defeated by reflected sunlight which is very common in high density urban centres.

Another drawback of prior art automated window covering systems is that although designs that are less expensive may be appealing from a price perspective, such designs frequently have limited functionality. The limited functionality of the prior art automated window covering systems has the result that such systems are deemed to be unsuitable for commercial operations. This is a significant drawback in that the bulk of the perceived benefits from the installation of automated window covering systems are considered to be in installation of such systems for commercial operations.

What is needed is an improved apparatus and system which addresses at least some of these limitations in the prior art.

SUMMARY OF THE INVENTION

In one aspect, the present disclosure relates to a system for controlling slat based window coverings to adjust admitted daylight, comprising: one or more slave modules for controlling a motor to adjust a slat based window covering, the one or more slave modules connected via a communication network; and a master module for providing a communication gateway to the one or more slave modules via the communication network, wherein the master module is configured to receive one or more position requests for the slat based window coverings and to transmit the one or more position requests to one or more slave modules for enabling adjustment of the one or more slat based window coverings in sequence.

Said system of the present invention may further be an embodiment that is characterized by the master module being further configured to detect the position of each slat based window covering via the one or more slave modules, and to initiate correction of any positional errors reported by the one or more slave modules.

Said system of the present invention may further be an embodiment that is characterized by the communication network comprising a bus, and the bus includes repeaters for boosting signal and power to slave modules and respective motors for controlling the slat based window coverings.

Said system of the present invention may further be an embodiment that is characterized by the master module being configured to learn a desired position for each slat based window covering in response to user preferences received from a user, and to change the position requests in response to the received user preferences.

In another aspect, the present disclosure relates to an apparatus for controlling slat based window coverings to adjust admitted daylight, said apparatus characterized in that it comprises: a master circuitry incorporating a microcontroller; one or more blinds positioned by one or more windows, said one or more blinds being connected to a motor operable as one or more slaves controlled by the master circuitry; and one or more sunlight intensity sensors operable to detect sunlight intensity directed to the one or more windows and to communicate sunlight intensity data to the master circuitry, the master circuitry being operable to control the adjustment of one or more of the one or more slat based window coverings in accordance with the sunlight intensity data by way of the microcontroller to avert undesirable solar heat gains and achieve daylight harvesting.

Said apparatus of the present invention may further be an embodiment that is characterized by communication between the one or more slaves and the master circuitry being via proprietary bus.

Said apparatus of the present invention may further be an embodiment that is characterized by the master circuitry being operable to control the position of one or more of the one or more blinds in accordance with a user request provided to the master circuitry by a user.

Said apparatus of the present invention may further be an embodiment that is characterized by the apparatus further comprising an external bus operable to receive external commands from an external controller and to communicate said external commands to the master circuitry, and the master circuitry is operable to control the one or more blinds in accordance with said external commands.

Said apparatus of the present invention may further be an embodiment that is characterized by the apparatus further comprising a power and interface unit.

Said apparatus of the present invention may further be an embodiment that is characterized by the one or more slaves each comprising a slave control circuit and a motor drive circuit controllable by the master circuitry to position the one or more blinds.

Said apparatus of the present invention may further be an embodiment that is characterized by the one or more slaves being interconnected.

Said apparatus of the present invention may further be an embodiment that is characterized by the one or more slaves being operable to transmit signals to the master circuitry and the microcontroller being operable to interpret said signals and to control a motor of the slave to position the one or more of the one or more blinds.

Said apparatus of the present invention may further be an embodiment that is characterized by the microcontroller being operable to utilize the signals transmitted by the one or more slaves to determine that one or more of the one or more blinds is malfunctioning and to generate commands and transmits said commands to the one or more blinds that is malfunctioning to correct said malfunction in a manner that averts damage to the one or more blinds.

Said apparatus of the present invention may further be an embodiment that is characterized by the apparatus incorporating one or more sensors for detecting one or more factors pertaining to the environment of the one or more blinds, and said one or more sensors being operable to transmit signals to the master circuitry and the microcontroller of the master circuitry being operable to interpret said signals and to control the one or more blinds in accordance with the interpreted signals.

Said apparatus of the present invention may further be an embodiment that is characterized by each of the one or more blinds having a motor incorporated within a headrail of said one of the one or more blinds, and said motor is operable to control the one of the one or more blinds as one of the one or more slaves in accordance with the control of the master circuitry.

Said apparatus of the present invention may further be an embodiment that is characterized by a power and interface circuit being connected to the master circuitry and the power and interface circuit is operable to provide signals to the microcontroller the microcontroller being operable to interpret said signals and to determine that power outage is imminent and to control the system any loss of positional information is averted during the power outage.

In yet another aspect, the present disclosure relates to an energy efficient system operable to control slat based window coverings to adjust admitted daylight so as to avert undesirable solar heat gains and achieve daylight harvesting, said system characterized in that it comprises: one or more slave modules being operable to control a motor to adjust a slat based window covering, the one or more slave modules being interconnected via a communication network; and a master module operable to provide a communication gateway to the one or more slave modules via the communication network, wherein the master module is configured to receive one or more position requests for positioning the slat based window coverings and to transmit the one or more position requests to one or more of the one or more slave modules and said one or more slave modules being operable to control the adjustment of the one or more slat based window coverings.

Said energy efficient system of the present invention may further be an embodiment that is characterized by the master module being configured to detect the position of each slat based window covering via the one or more slave modules, and to initiate correction of any positional errors reported by the one or more slave modules.

Said energy efficient system of the present invention may further be an embodiment that is characterized by the communication network comprising a bus, and the bus includes repeaters for boosting signal and power to the one or more slave modules and the motors of the one or more slave modules to control the slat based window coverings.

Said energy efficient system of the present invention may further be an embodiment that is characterized by the master module being configured to determine over a period of time one or more preferred positions for each slat based window covering in response to user preferences received from a user over the period of time, and upon such determination of the one or more preferred positions being generated being operable to adjust the slat based window coverings in accordance with the determined one or more preferred positions.

Said energy efficient system of the present invention may further be an embodiment that is characterized by the master module being operable to determine one or more optimum positions of each slat based window covering over a period of time to comply with energy consumption guidelines and to generate commands to position each slat based window covering in such one or more optimum positions over the period of time.

Said energy efficient system of the present invention may further be an embodiment that is characterized by the master module being operable to generate a sleep mode and to control the one or more slave modules to function in said sleep mode.

Said energy efficient system of the present invention may further be an embodiment that is characterized by the control of the master module achieving operation of the system that is energy efficient and cost-effective.

In still another aspect, the present disclosure relates to a method for controlling slat based window coverings to adjust admitted daylight, said system characterized in that it comprises the steps of: one or more slave modules for controlling a motor to adjust a slat based window covering, the one or more slave modules being interconnected via a communication network; and a master module for providing a communication gateway to the one or more slave modules via the communication network, wherein the master module is configured to receive one or more position requests for positioning the slat based window coverings and to transmit the one or more position requests to one or more of the one or more slave modules and said one or more slave modules controlling the adjustment of the one or more slat based window coverings.

Said method of the present invention may further be an embodiment that is characterized by the additional step of the master module generating one or more calculations and controlling the curve of the one or more slate based window coverings in accordance with said one or more calculations.

In this respect, before explaining at least one embodiment of the apparatus and system of the present disclosure in detail, it is to be understood that the present apparatus and system is not limited in its application to the details of construction and to the arrangements of the components set forth in the following description or illustrated in the drawings. The present apparatus and system is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The invention will be better understood and objects of the invention will become apparent when consideration is given to the following detailed description thereof. Such description makes reference to the annexed drawings wherein.

DETAILED DESCRIPTION OF THE PREFERRED EMBODIMENT

Figure 1:
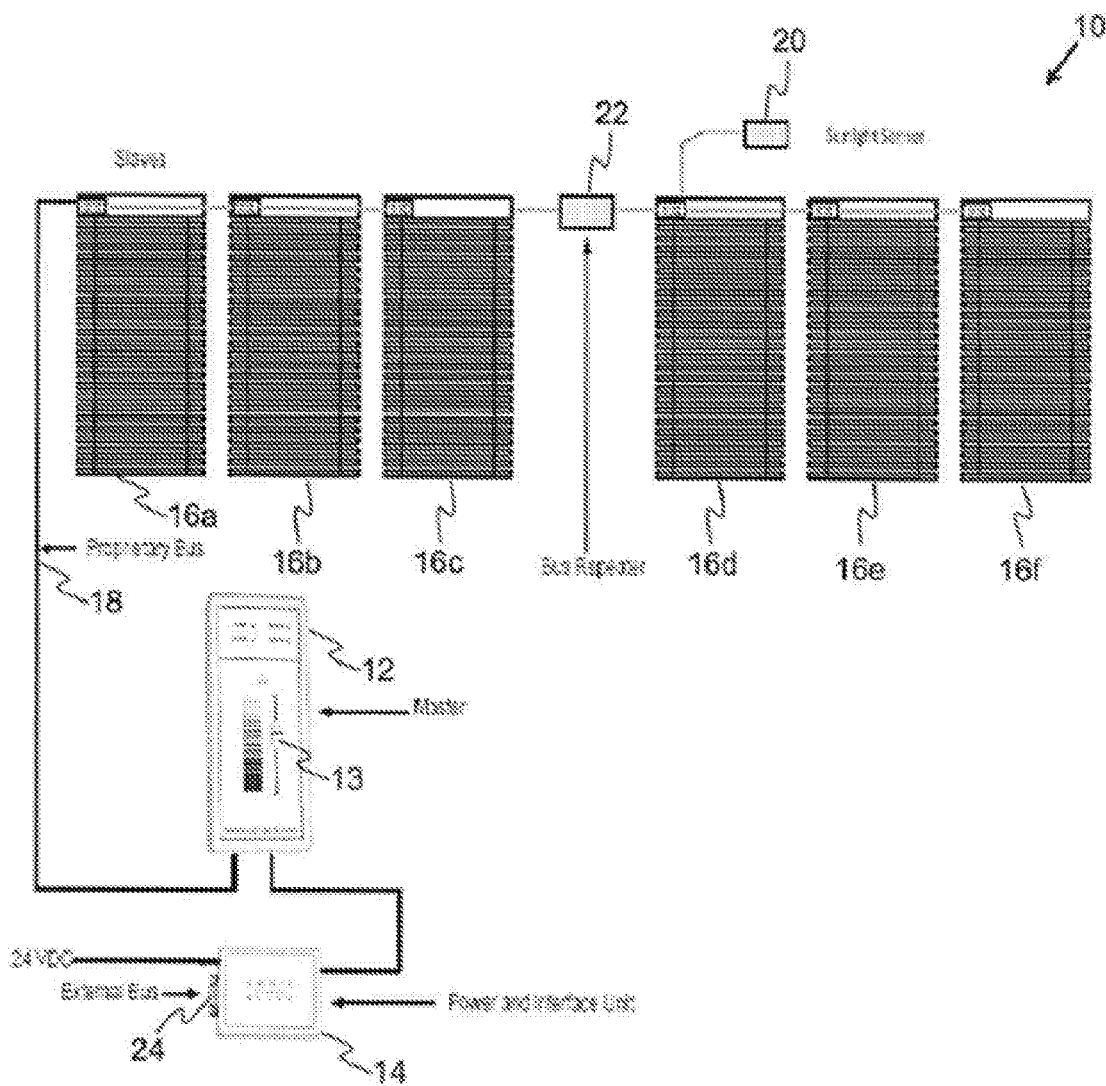
FIG. 1 shows an illustrative system overview in accordance with an embodiment of the present invention.

The present invention is an apparatus, system, method, computer program, and computer program product for controlling window coverings to adjust admitted daylight. The present invention comprises a control system for controlling the amount of daylight admitted through adjustable window coverings. In an embodiment of the present invention, the system includes a stand-alone open loop proportional control subsystem including a calculation or algorithm that is operable to convert a sunlight sensor signal to a blind slat position based on a predetermined curve stored in memory. In another embodiment of the present invention, the system is operable to transmit the sunlight sensor information, for example, such as in Lux, to an external system, which may then provide blind slat position requests based on some other curve, algorithm, or user need. The blind slat position may be controlled by the system to avert undesirable solar heat gains and also achieve significant daylight harvesting.

In one embodiment of the present invention, the system may also function by transmitting the sunlight sensor information, for example, such as in Lux, to an external system. The external system may then provide blind slat position requests based on any of the following: some other curve; an algorithm; or user need. For example, a daylighting control system of the present invention may request a particular blind to open fully to allow for maximum daylight harvesting. The control system of the present invention may operate to open said blind fully despite the fact that the proprietary curve stored in memory would dictate that this particular blind be partially closed. The external system can thus request specific blind positions via a communications interface which may override the predetermined curve that is stored in the memory of the system.

In one embodiment of the present invention, the system may also function as a standalone, manually activated device. In such an embodiment of the present invention a user may request specific blind slat positions by adjusting a user interface. A skilled reader will recognize that the user interface may be of various types, for example, such as a dial or slide control.

The present invention offers several benefits and advantages over the prior art window covering systems. For example prior art rollershades cannot evenly alter the transmissivity of the window from 0 to 100% over the entire window surface. The present invention is operable to achieve even alteration of the transmissivity of the window from 0 to 100% transmissivity. The present invention may therefore avert undesirable solar heat gains and also achieve significant daylight harvesting.

Embodiments of the present invention may be operable to provide for significantly increased flexibility for controlling the admittance of light more evenly over the entire window surface than prior art rollershades.

Embodiments of the present invention that are motorized tilt only slat based systems may be generally less expensive than prior art rollershades because motorized tilt only slat based systems: may require significantly less motor torque; and may not require complex clutching systems.

Embodiments of the present invention that are tilt only slat based systems may also provide a significantly simpler position control algorithm than lift and tilt prior art systems. Prior art lift and tilt systems may require dual motorization and control packages to perform the two functions of tilting and lifting. This adds to the cost of the prior art systems, and the present invention may for this reason, as well as other reasons, be more cost-effective than prior art systems. Thus, the present invention may offer a greater return on investment than prior art systems, due to the configuration of the present invention and function of the present invention, as well as the efficacy of the present invention in averting undesirable solar heat gains and achieving significant daylight harvesting. The present invention may significantly reduce of a building's energy consumption compared to the results achieved by installed prior art systems.

The present invention may contain feedback information and may not rely upon a user to time the energization of a motor to achieve position, for example, such as slat rotation position, as is require by the prior art. Moreover, the present invention may not require calibration in situ, or periodic recalibration which is required by prior art system. The present invention may also not suffer from drift as is experienced by prior art systems.

The present invention may not experience a loss of positional information during a power outage, as is experienced by the prior art systems. The present invention may further not be required to be constantly powered on, as is required by the prior art systems. As a consequent the present invention may provide significantly increased energy efficiency over prior art systems.

Proprietary communications networks may be suitable for entirely closed systems, but can be limiting for connection to external networks. Thus, for external communications to/from a system, a standard backwards compatible interface such as RS232 can be used to connect to virtually any communication bus commercially available, through the introduction of commercial off-the-shelf (COTS) interface boxes. For example, USB to RS232 converters, RS232 to Ethernet converters, and other types of connectors are easily obtained from electronics parts suppliers.

Such systems employ relative positioning or timed control of blind position. In contrast, the present system retains position information even with no power applied. No calibration of the system of the present invention is required and the system does not suffer from position drift. Calibration is required for prior art systems, and prior art systems further typically suffer from position drift. The present invention does not require integration of a limit switch to address positional drift, whereas limit switches are frequently included in prior art systems to combat positional drift. For this reason, the present invention may incorporate a less expensive and more reliable mechanism than prior art systems. Furthermore, with the system of the present invention may be operable so that position information is a continuous analogue value, for example, such as between 0% to 100%. This is an advantage over the prior art which provides discrete position information, for example, such as open, half open, and closed.

The present invention therefore offers several advantages and benefits that overcome limitations of prior art window covering systems. The present invention further fills an existing gap in such technology as it provides an inexpensive, high performance motorized control system for slat based window coverings, for example, such as venetian blinds and shutters. In one embodiment of the present invention, the system may convert standard commercial and residential slat based window coverings into intelligent apertures operable to control the admittance of daylight.

Some desirable features of embodiments of the present invention include the following: (i) the system may require no calibration or recalibration; (ii) the system may be easy to install; (iii) the system may interface to virtually any communications network; (iv) the system may interface to standard lighting control systems; (v) the system may be quiet and move smoothly during automatic operation; (vi) the system may respond immediately to manual requests; (vii) the system may revert to automatic control after a time period; (viii) the system may be compatible with most commercial off-the-shelf (COTS) venetian blinds and shutters; (ix) the system may use minimal power; (x) the system may have intelligent self diagnostic capabilities and the ability to report errors externally when queried; and (xi) the system may be able to transmit position requests and return status and data over long distances, and provide sufficient power to a group of blinds over potentially long distances away from the power source.

The present invention further offers advantages and benefits that address a set of problems and requirements relating to known prior art. For example, using COTS venetians in embodiments of the present invention system can greatly reduce the overall manufacturing costs and allow for the adoption of said system by numerous fabricators. The present invention is designed so that the system should work with virtually any size and type of venetian blind. However, many of the available prior art blinds are sticky because they are normally manually operated. In particular, the internal tilt mechanism often binds which is problematic for an automated system. Therefore, there is a problem relating to eccentric rotation created by known prior art blinds. Embodiments of the present invention may integrate prior art blinds despite this problem, and may overcome the problem by monitoring the drive current, for example, such as integration. Embodiments of the present invention may further be operable to reset stuck drives, and to create a calculation or other algorithm to back up a bit and try again if the tilt mechanism binds, sticks, or there is an eccentric rotation problem experienced by the present invention. Moreover, embodiments of the present invention may incorporate position sensor so as to be operable to allow for eccentric motion.

Prior art linked systems can draw excessive amounts of power if all of the linked systems are commanded to move simultaneously. This can result in line voltage drops which can adversely affect the performance of the electronics of the system. Embodiments of the present invention overcome this problem presented by prior art systems by staggering the operation of the linked systems by recognizing some as slaves, so that the operation of the slaves is staggered for global commands. For example, a delay may be implemented in an embodiment of the present invention and said delay may be based in the slave's address or identification. For an embodiment of the present invention that is a system that comprises many large blinds the blinds may be commanded to move individually one at a time. During normal operation of the embodiments of the present invention, automatic slow movement blinds may energize their motors at random and in a staggered fashion.

In prior art systems a communications bus must travel over long runs and be nearly error free. Embodiments of the present invention overcome this problem in prior art systems by integrating proprietary communications hardware and software protocol over a network internal to the system. Such embodiments of the present invention utilize slaves to perform internal error checking and a bus repeater to provide a means to extend power and communications over greater lengths.

System power in prior art systems must travel over long runs with accumulated power draw bringing down system voltage near the end of the bus. Embodiments of the present invention overcome this problem of prior art system by providing a bus repeater as a means to extend power and communications over greater lengths. Staggered operation in embodiments of the present invention reduces peak loading on the power supply.

Prior art systems must use minimal power while staying on standby and monitoring sunlight levels. Embodiments of the present invention overcome this problem of prior art systems by being operable to power down slaves via a master until a slave is required to move. The master goes into sleep mode in such embodiments of the present invention. No power is therefore required to maintain position information. Such embodiments of the present invention are markedly different than prior art rotary encoder based systems which must stay powered on or re-calibrated by moving to a limit switch defined position. And thus, the present invention overcomes this problem that exists in prior art systems.

Automated prior art systems with powerful motors and position feedback sensors can destroy themselves if the feedback sensor fails. Embodiments of the present invention overcome this problem of prior art systems by incorporating slaves that have built in awareness of the rationality of the position feedback signal and can take corrective action. Such slaves are operable to: determine that they are stuck; determine that they are moving in the wrong direction; and determine that the signal is outside the normal range. When a slave determines that the signal is outside the normal range, a corrective calculation or algorithm allows the slave to attempt to 'nudge' itself back to a position that is a position where the signal is again rational as it is interpreted by the slave. Such nudging may comprise slow movement and/or movement occurring in short intervals. In such embodiments of the present invention, a thermal fuse may also be used to provide further protection to the system elements. A feedback potentiometer of such an embodiment of the present invention may have hard mechanical stops built into it that prevent the blind from destroying itself in the event of a complete system failure. The blind of such an embodiment of the present invention may recover from a failure by nudging itself away from the hard mechanical stop.

Torque requirements in prior art systems vary greatly from open to close position. Applying an unintelligent control algorithm in such prior art systems would create a result that is movement that is too fast and too noisy in some places and not powerful enough in others. Moreover, a simple proportional controller will not perform adequately in such prior art systems due to backlash and spring-like characteristics of the blinds, for example, such as COTS blinds. This problem of the prior art is overcome by embodiments of the present invention wherein a slave positioning calculation or algorithm is applied to allow the system to be operable so that it allows for backlash, and provides just enough power to overcome the physical inertia of the blind or shutter.

The relationship between sunlight intensity and slat angle in prior art systems is not well defined or well known and can change depending on external needs, for example, such as lighting control systems. Embodiments of the present invention overcome this prior art problem by incorporating a custom curve which can be stored in EEPROM which dictates blinds position vs. daylight intensity. The curve of such embodiments of the present invention may be modified by an external source. Such embodiments of the present invention may also incorporate a sensitivity adjustment operability that allows an end user to tailor the response of the system in order to account for certain features of the environment surrounding the system, for example, such as window tinting, overhead shading, or other features.

Most prior art motorized systems are noisy and disruptive, in particular to persons and environments positioned near to the systems. Embodiments of the present invention overcome this prior art problem by applying a slave positioning calculation or algorithm that provides just enough power to overcome the physical inertia of the blind or shutter. In a normal automatic mode of such embodiments of the present invention, the slats are moved in small increments with lengthy delays between pulses. This makes the motion and sound of such embodiments of the present invention almost imperceptible to persons positioned near to the system.

A skilled reader will recognize that several embodiments of the present invention may be possible, as are disclosed herein. An illustrative example of an apparatus and system in accordance with the present invention is described below, with reference to the drawings.

An overview of the system of an embodiment of the present invention is shown in FIG. 1. As shown, the system 10 may comprise a master control unit 12, a power and interface unit 14, and multiple blinds 16a, 16b, 16c, 16d, 16e, 16f or shutters connected via a proprietary bus 18. The multiple blinds or shutters may include one or more slaves. The system further incorporates a sunlight sensor 20, a bus repeater 22 and an external bus 24.

Figure 2:
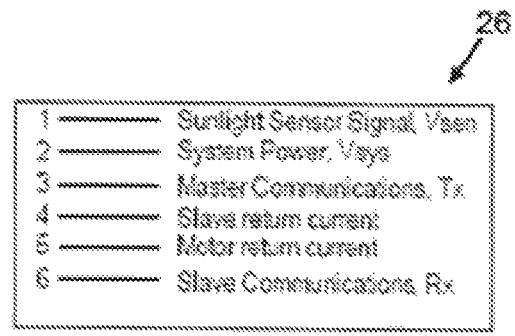
FIG. 2 shows an illustrative bus pin-out in accordance with an embodiment of the present invention.

A bus pin-out 26 of an embodiment of the present invention is shown in FIG. 2.

An embodiment of the present invention may be operable in accordance with a method whereby a slat angle position request is generated by a method that is an automatic mode, a manual mode and/or a remote mode. The master conveys the position request to the slaves via the proprietary bus. The position request may incorporate speed component, for example, such as fast or slow. Such speed component of the position request is intrinsically embedded in the command protocol. Once the slaves have received the speed command, each slave energizes its individual motor and monitors the angular position of its slats until the requested position is reached and thereby achieved. The master is operable to address and command each slave individually, or the master can address and command the salves as a group.

The system of the present invention may work with virtually any commercially available slat based window covering, for example, such as venetian blind and shutters. The present invention may be retro-fitted into existing sites where window coverings are already installed. This aspect of the present invention is yet another benefit and advantage offered by the present invention over prior art systems. Prior art systems generally are not designed to be fitted to third party systems, and typically include proprietary precision hardware. The hardware of such prior art systems is often expensive. To provide a cost effective system, complex and precise mechanics that exist in prior art are not included in the present invention. Instead the present invention incorporates sophisticated embedded control software. Therefore, when existing blinds are converted to be incorporated into the present invention the control software of the present invention is substituted for, and replaces, the mechanics of the prior art system. The result is that inexpensive blinds and shutters can be controlled in an economical but precise manner when prior art systems are converted to, or replaced by, the present invention system.

The operability of the present invention system to function so that inexpensive blinds and shutters can be controlled in a economical but precise manner allows the system to achieve reasonable payback periods, whereby the person installing the present invention receives a return on the investment of the cost of installing and utilizing the blinds, through energy savings achieved by controlling the admission of daylight as is achieved the present invention system.

Figure 8:
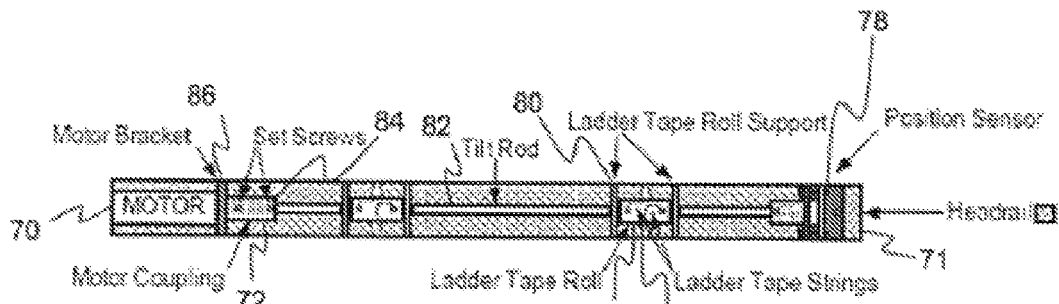
FIG. 8 shows a schematic diagram of a headrail apparatus in accordance with an embodiment of the present invention.

As will be described in more detail with reference to FIGS. 8 and 9, a typical venetian blind can be converted so as to be incorporated in an embodiment of the present invention in a manner that allows it to be automated through the use of two set screws to attach a position sensor and a motor to the tilt rod, and installing a single rivet to fix the position sensor to the headrail. Installation of embodiments of the present invention can be generally be performed and completed within minutes.

In an embodiment of the present invention, as shown in FIG. 1, the master draws minimal power and the slaves draw no power while the system is in a quiescent rest state. As the system is designed for energy savings, it is configured so as to be energy efficient in its operability and function. The system may be awoken from a quiescent state as a result of any of the following: significant changes occurring in sunlight intensity; remote commands; or movement of the user interface. Due to the design of the position sensor, slaves can be powered down indefinitely without loss of positional information. This aspect of the present invention offers a benefit over the prior art because prior art systems often require the constant application of power to maintain position information. If a prior art system loses power an in situ calibration is frequently required to re-establish the position information. The present invention is operable so that it does not require in situ calibration to re-establish position information should power be lost by the system, and furthermore does not require constant power to maintain position information.

Embodiments of the present invention are capable of working in concert with any or all of the following: building automation systems; facilities management systems; and lighting control systems. For example, in one embodiment of the present invention, an external RS232 port and an optional 0 to 10 V interface unit may be incorporated in the system such that the system can control virtually any individual blind within a building.

Window coverings are an often overlooked component in building control and management systems due to the cost of automating them and typically limited functionality that prior art systems achieved. Any building wherein the slat position of all of the blinds within the building can automatically be controlled will be able to achieve much greater results in terms of daylight harvesting, natural daylighting and reduced energy consumption. Some public power authorities, for example, such as the Ontario Power Authority, plan to begin to issue 'peak demand' signals to participating clients. Participating clients may receive rebates in exchange for reducing the energy consumption of their building when peak demand is reached. Peak demand may occur at a particular point in time, during multiple points in time, or over one or more durations of time periods, during a day, for example, such as at noon, or upon the time during the day when the sun rays are the most intense during a bright sunny day in the summer.

The present invention system and method may be utilized to assist buildings to achieve immediate reductions in energy consumption by partially or fully closing blinds. The blinds to be so partially or fully closed may be one or more blinds, and could be all of the blinds within a building.

In one embodiment of the present invention, as shown in FIG. 1, the master may provide the gateway to the slaves. The master can receive position requests via an external port or an external bus, for example, such as a RS232 port. The master may translate such position requests to a command string that is communicated by the master to the slaves via the proprietary bus. In embodiments of the present invention a proprietary electrical bus and a calculation or algorithm, for example, such as a receive_char ( ) algorithm, may cause the present invention to be operable to receive or transmit transmissions over long distances.

For example, a receive_char ( ) algorithm incorporated in the present invention may be as follows:

system may reducing peak current draw from the power supply. This allows the system to use a lesser supply of power and thin wire design as compared to prior art systems. For example, flat ribbon cable may be used to make installation of embodiments of the present invention easier for those persons installing the system. Utilizing thin wire and the reduced supply of power required by the present invention may also prevent excessive voltage drops on the power supply lines as a result of all motors starting up simultaneously.

```
receive_char( )
{
  comm_byte = 255;                      /* Initialise the received data to an irrational value */
  start_timer( );                       /* Initialise the timer */
  WHILE(RXB == 0)                       /* Wait until the communications D/I input is high - start bit */
  {
   IF (timer > START_DELAY) exit;       /* We have waited too long for the start bit; exit */
  }
  start_timer( );                       /* Re-initialise the timer */
  WHILE(timer < HALF_BIT);         /* We have received the start bit, wait here for the first data bit */
  FOR( j=0; j<8; j++)                   /* We can now collect the data. We need to fetch 8 bits */
  {
    lo_bit = 0;                         /* Initialise the bit counters */
    hi_bit = 0;
    FOR(i=0; i< BIT_TIME; i++)          /*Read the comm D/I continually for the entire bit time */
        {
        IF(RXB == 1) hi_bit = hi_bit + 1;   /* Count the number of instances of high and low states for the comm D/I */
        ELSE lo_bit = lo_bit + 1;
        }
   IF    ( ( hi_bit/lo_bit) > NOISE_RATIO )          /* Is this a valid 1 bit? */
          comm_byte = (comm_byte OR 10000000b);   /* If so place a 1 in the received char MSB */
   ELSEIF ( ( lo_bit/hi_bit) > NOISE_RATIO )         /* Is this a valid 0 bit? */
          comm_byte = (comm_byte AND 01111111b);  /* If so place a 0 in the received char MSB */
    ELSE return(255);                                /* The transmission is too noisy so abort and return with an
irrational value */
    IF ( j <> 7) comm_byte = comm_byte >> 1;        /* Shift the received bit one place to the right unless it is the last bit
received */
  } /* End of FOR loop */
  return(comm_byte);                                 /* Successful reception of a byte of data, return it */
} /* End of receive_char( ) function */
```

The master monitors current flow to slaves, and is operable to detect if one or more blinds of the slaves has become stuck. For example, the master may recognize that current flow to one or more slaves is continuing for a longer period than recognized by the master as a normal period for the function of the one or more slaves, and the master interprets this as an indication that the desired position cannot be reached by the one or more slaves, or that the one or more slaves has malfunctioned. The master is operable to take corrective action may include for example powering down and rebooting of one or more of the slaves. In an embodiment of the present invention, the master may be operable to recognize the total amount of current drawn by the slaves over time and may function so as not to allow the total current drawn by the slaves over time to exceed a predetermined level. In this manner embodiments of the present invention may be operable to employ a self defence mechanism which is particularly helpful if COTS venetian blinds are integrated in the present invention as COTS blinds can be 'sticky' at times.

The master keeps track of the number of times that slaves become stuck, and can provide this information to a user upon receipt of a query from the user. This operability of the present invention provides a user with a remote diagnostics capability, as well as the ability to discern if the system requires onsite maintenance.

In one embodiment of the present invention, the master controller can stagger the operation of the slaves within the system. Staggering of the operation of the slaves within a In one embodiment of the present invention, the mode of system operation can be selected through the use of two DIP switches. The first switch determines if the system will respond to the changes in the sunlight sensor signal in an automatic mode. The second switch determines if the system should close the blinds at nightfall. By setting the mode of operation, the system can be custom tailored to any application. For example, a residential application may seek to maximize solar heat gains during the winter. In such an application of the present invention, automatic mode may be disabled and the blinds may be fully open during the day. If night close is enabled as an application, the blinds may close fully at sunset.

As another example of an application of the present invention, a bank may require automatic mode to control the influx of sunlight into a branch office but, for security reasons, additionally require that the blinds be open fully at night. In this example, the automatic mode would be enabled and the night close would be disabled in the operation of the present invention system.

In one embodiment of the present invention, if the system is operating in automatic mode, the sunlight sensor reading is converted to a slat position by virtue of a proprietary curve stored in the memory of the master. This curve may be formulated through user experience and observation, or it may be based on a suitable calculation or algorithm. For any given level of sunlight intensity, the curve provides the slat angle which would be chosen by a typical user if he or she was to manually adjust the blinds at that moment in relation to the position, intensity or other aspects of the sun that are determined by the sun sensor. Alternatively, this curve can be downloaded to the master by an external source, and saved in non-volatile memory, for example, such as EEPROM.

In one embodiment of the present invention, the system may include learning calculations or algorithms that are utilizable to adapt the system to changing preferences. For example, in an office building, workers may be able to request blind positions for those blinds near their workstation. A user may be required to be granted permission in order to be able to request blind positions relating to blinds near his or her workstation. A worker may enter such a request via the worker's desktop workstation. An entered request may be communicated over the office network and ultimately sent as position requests to the master that controls the specific blinds that are near the worker's workstation that the worker has requested be adjusted. Thus, each blind or shutter in the system may be uniquely identified by the system and addressed and controlled by the system.

The present invention may continuously correlate user requests to the sunlight intensity at the time when the request is received by the system. The master may use this correlation data to determine the user's preference regarding position of one or more specific blinds when the sunlight intensity is at a particular level. The system may customize the proprietary curve stored in EEPROM relating to the one or more specific blinds in accordance with the user preference. Eventually, user requests may not be required to position the one or more blinds near the user's workstation as the specific blinds may be automatically moved to the user's preferred position in accordance with changes in sunlight intensity levels by the system. The adaptive nature of the system may promote user acceptance of a building automation window coverings system that is the present invention. The system may further be operable to intrinsically favour energy savings over user preferences.

In another embodiment of the present invention, when the system is operable in a manual mode, slat position requests may be based on the manual positioning of the analogue slider on the master front panel. Whereas when the system is operable in a remote mode, an external device may send slat position requests to the master. The master may then convey these slat position requests to the slaves.

In a further embodiment of the present invention, a master may report system errors to an external device upon receiving a request from an external device. The master may also report current sunlight levels, for example, such as in Lux, to an external source. This operability of the system may permit one or more of the blinds in the system to be controlled by an external automation system. The external automation system may be external to a building where the present invention is installed.

Sunlight intensity may be reported to an automation system without the requirement of additional hardware. The automation system may be a system that automates blinds throughout a building, or that automates blinds in a particular area in a building, and the automation system may be internal or external to a building where the present invention is installed. The automation system may be operable to achieve determinations and based upon such determinations to generate particular decisions pertaining to the desired position of one or more of the blinds. Such determinations and decisions may involve the analysis and evaluation of multiple factors, for example, such as daylight harvesting, user preference, and peak demand signals from power authorities, as well as other factors.

For example, should the peak demand signal request that a building reduce its energy consumption, the building automation system of the present invention may query the sunlight intensity at several locations throughout the building. Once this information is gathered by the system it may operate to close only those blinds in the windows where sunlight intensity is greatest or reaches or exceeds a particular threshold. Windows with moderate to low incoming sunlight, or where sunlight intensity does not reach or exceed a particular threshold, may be allowed to remain partially open thus providing natural daylight without reducing the ability of the system to reduce the cooling load for the building as a whole. Reducing the cooling load of a building further reduces the energy consumption of the building. Therefore, the present invention is operable to provide a response that is more intelligent than a mere blanket response that requires all of the blinds throughout the building to be closed in response to the peak demand signal. Thus, the present invention offers flexibility and operability that is specifically related to factors, including for example, real-time or virtually real-time factors.

In another embodiment of the present invention, a potentiometer may be incorporated in the system, said potentiometer being operable to provide a sensitivity adjustment feature. The sensitivity adjustment feature may function so that a user may compensate for effects pertaining to the windows, for example, such as shading or glazed windows. The provision of a sensitivity adjustment feature may allow the user to tailor the response of the system to suit his needs. For example, window glazing may reduce the intensity of the signal received by the sunlight sensor, but the glazing may not effectively reduce the heat transfer that passes through the window while bright direct sunlight is directed to the window. The user may utilize the sensitivity adjustment feature of the present invention to adjust the settings of the system so that the system operates in a manner that is sensitive to the sunlight intensity and the factors pertaining to the windows. For example, the system may be adjusted such that the system is set to operate to begin to close the blinds upon weak levels of sunlight intensity being detected by the sunlight sensor.

In one embodiment of the present invention an apparatus is incorporated that provides conditioning of the DC power supply input and also provides overvoltage protection to the system. Such an apparatus may also monitor the DC input and detect loss of DC power. The apparatus may be operable to provide a 'loss of power' signal to the master before all power has actually dissipated or otherwise been lost. The system may be operable upon receiving or otherwise detecting a loss of power signal to put itself into an orderly state prior to entering a sleep mode. For example, the system putting itself into an orderly state prior to entry a sleep mode may involve the system operating to cease the actuation of the slave motors when an imminent loss of power is detected.

In an embodiment of the present invention, each slave receives position commands from the master. Upon receipt of a master command from the master the slave may be operable to actuate a motor. Such actuation of the motor is in the appropriate direction to rotate the tilt rod or right angle gearbox until the desired slat position is achieved that complies with the position command.

A position sensor may be incorporated in the system to provide any positional feedback that may be required for the operability of the present invention. The position sensor may be a custom position sensor and may further either be or integrate a position feedback sensor.

The position feedback sensor may be configured so as to be operable to allow for a large degree of eccentric motion in the tilt rod as it rotates. (Should the position feedback sensor not be so configured it would place an inordinate load on the motor and possibly break the potentiometer shaft after a period of time of use. Therefore, the position feedback sensor of the present invention overcomes a problem existing in the prior art.)

In an embodiment of the present invention, a mechanical stop may be integrated in the system and may provide a means of ensuring that a blind in the system is not destroyed or damaged if a motor is installed backwards or incorrectly in the system.

The present invention system may be installed with minimal knowledge of how the system works. This is in part due to the aspects of the system, such as the mechanical stop, other sensors (including the sensors that sense particular factors of the system function or the environment surrounding the system), and the operability of the system to generate certain determinations, which prevent the system from operating in a manner that would damage any portion or element of the system. These aspects cause the system to be able to identify installation errors and/or function hindrances, so that such errors and/or hindrances may be corrected.

In one embodiment of the present invention, the system is operable to detect a long term failure of the potentiometer. Such failure may be corrected for without destroying the blind. The correction may be by way of servicing of aspects and elements of the system. The design of the present invention provides a system that is robust and inexpensive. As an example, the design of the present invention allows the system to be COTS equipment which has imperfect mechanical characteristics, but to detect such imperfections so that corrections may be implemented in the system as required.

In another embodiment of the present invention, a custom positioning calculation or algorithm may be generated or otherwise incorporated. For example, a simple coupling algorithm between the motor and position sensor may sometimes result in oscillation as the blind typically acts as a torsional spring and system backlash is often significant. With a simple algorithm as is known in the prior art, that typically requires a large deadband, systems may be unable to precisely position the blinds at a specified slat angle. The slave calculation or algorithm of the present invention overcomes this problem. The slave calculation or algorithm is operable to detect and report multiple operational errors. Moreover, the self defence mechanisms, for example, such as are incorporated in the hardware and software aspects of the present invention, protect the blind and prevent excessive current flow in the event of a system failure.

In one embodiment of the present invention, the system may detect communications signals in both directions, for example, such as to and from the master. The system may be operable to provide error correction as necessary. Signals may then be re-transmitted at a greater strength. Power can be injected into the system via the bus repeater to extend the length of the system bus.

In another embodiment of the present invention, a 0 to 10 volt input module may be used to cause the system to be operable to interface to standard lighting control systems. An analogue input signal, for example, such as an input signal that is 0 to 10 volts, is converted to a command string. The command string is sent to the master in the same manner as commands are sent by an external device operable to control the system to the master, as is discussed herein. The module of the system provides complete optical isolation between the apparatus and the controlling source.

Figure 3:
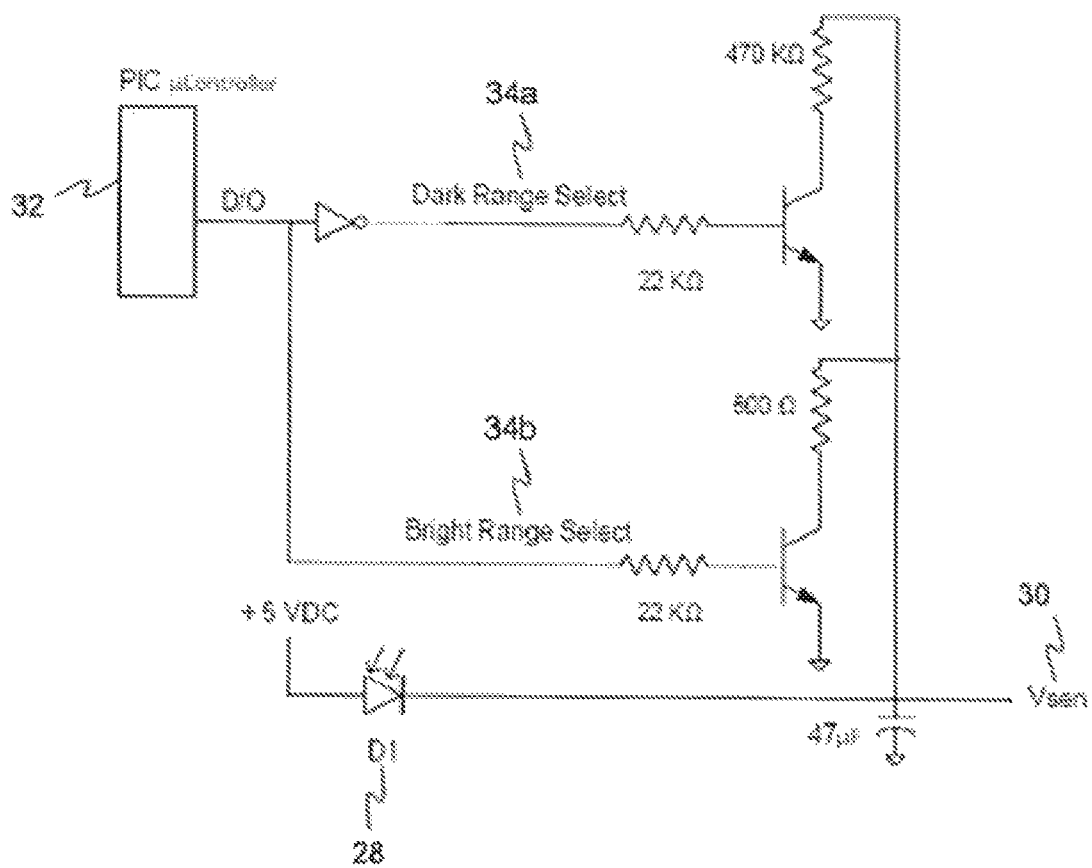
FIG. 3 shows a schematic circuit diagram for a sunlight sensor circuit in accordance with an embodiment of the present invention.

In an embodiment of the present invention, the master contains a micro controller that runs the custom software. Each blind or shutter, for example, such as each slave, also contains a micro controller. As shown in FIG. 3, the micro controller 32 of the master selects the desired range for the sunlight sensor circuit, for example, such as dark range select, bright range select, or other desired range, by setting the state of a digital output either high or low.

The photo-diode D1 28, provides the means of measuring incoming sunlight levels by converting the sunlight induced photo-current to the sunlight sensor signal Vsens 30 which can be converted to a digital value by the master micro controller's analogue to digital conversion circuitry. The photo-diode apparatus can be placed near any of the slaves within the system and the Vsens signal is transmitted over the proprietary bus back to the master.

Alternatively, the sunlight sensor circuit may be possessed by any of the slaves. Each slave is operable to read the analogue signal Vsens directly and to report the sunlight level back to the master. The report of the sunlight level may be in digital format. The report of the sunlight level may be sent via the proprietary communications link, for example, such as Rx, pin 6. An example of an Rx, pin 6 26 is shown in FIG. 2. In such an embodiment of the present invention, the Vsens signal is calibrated and can be reported to an external source via the RS232 link as a value in Lux or Klux.

In an embodiment of the present invention, the master contains a custom curve that is operable to set the desired angular slat position of the slaves as a function of sunlight intensity. When the system is in automatic mode, this desired position is communicated to the slaves via the proprietary bus. The slaves are operable to endeavour to position themselves as requested.

The angular position of the slaves may also be set by a user request. The user request can be actuated by moving the analogue slider on the front face of the master or a specific position can be requested remotely via an interface, for example, such as the RS232 interface.

Figure 20:
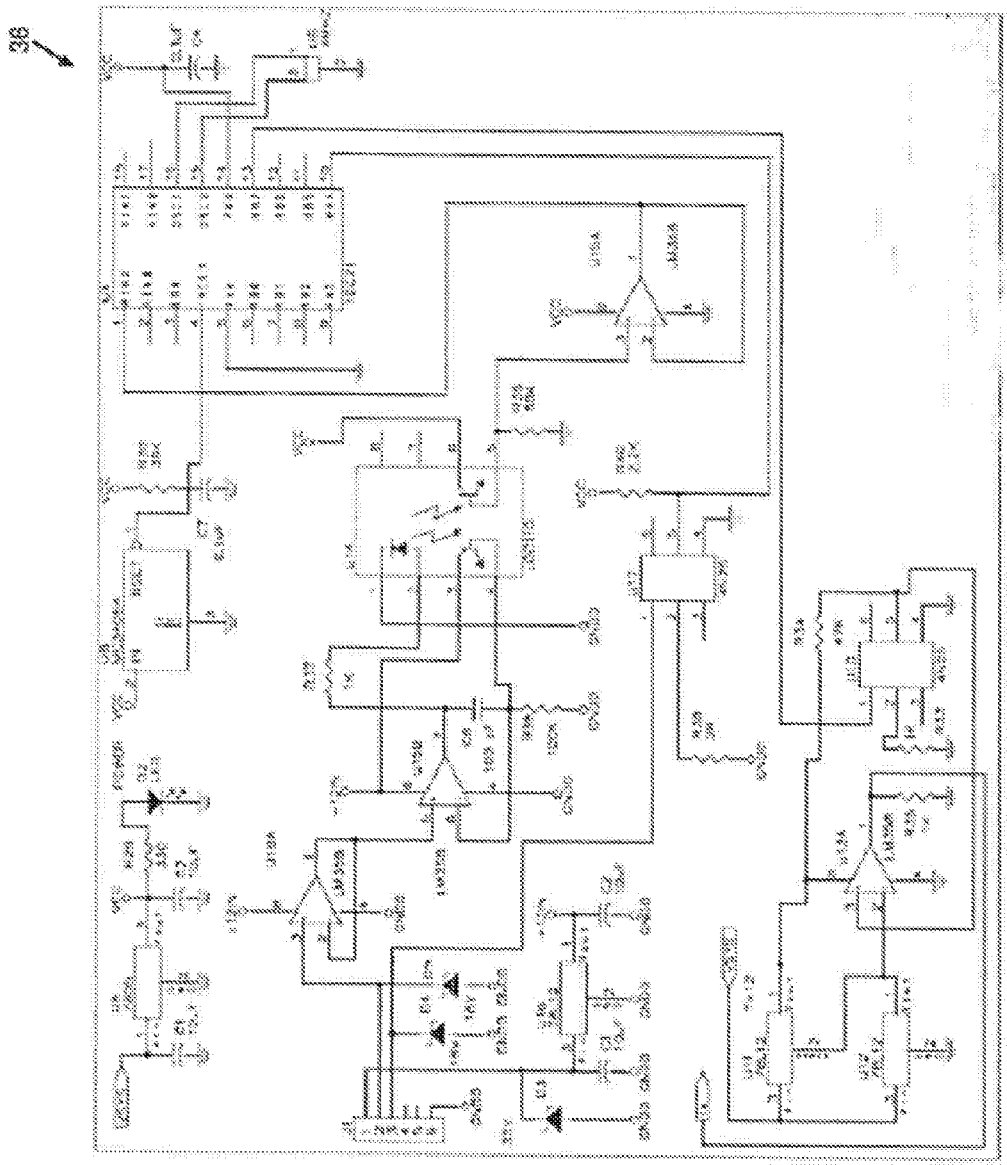
FIG. 20 shows a schematic circuit diagram of a 0 to 10V conversion module in accordance with an embodiment of the present invention.

In one embodiment of the present invention, the 0 to 10 volt conversion module 36, as shown in FIG. 20, is operable to converting an analogue voltage signal to a command string, for example, such as an RS232 command string. The master will receive the command string from the volt conversion module and operates to convert the command string to a specific position request. The position request is communicated by the master to the slaves. Upon the analogue slider on the front panel of the master being moved, an analogue voltage is converted by the master to a specific position request that is relayed by the master to the slaves.

A skilled reader will recognize that the description of embodiments of the present invention herein, and the embodiment shown in FIG. 20, are merely examples of possible configurations of the present invention.

A skilled reader will recognize that a variety of switches, analogue or digital or touch panels, or other devices may be incorporated in the present invention to be operable to convey the desired position request of the user to the system generally and to and between the elements of the system. For example, a slideable analogue slider 13 is shown in FIG. 1 as integrated with the master 12. The analogue slider may be slid to various positions. The position of the analogue slider may correspond approximately to the blind position, so that one or more slaves may be controlled by the master to be positioned to a particular position in accordance with the position of the analogue slider that indicates the requested position for the blinds of each of the one or more slaves. The analogue slider is shown in FIG. 2 as displayed on the front of the master, however a skilled reader will recognize that the switches, analogue or digital or touch panels, or other devices incorporated in the present invention may be positioned in a variety of areas and incorporated with a variety of elements of the present invention.

Figure 4:
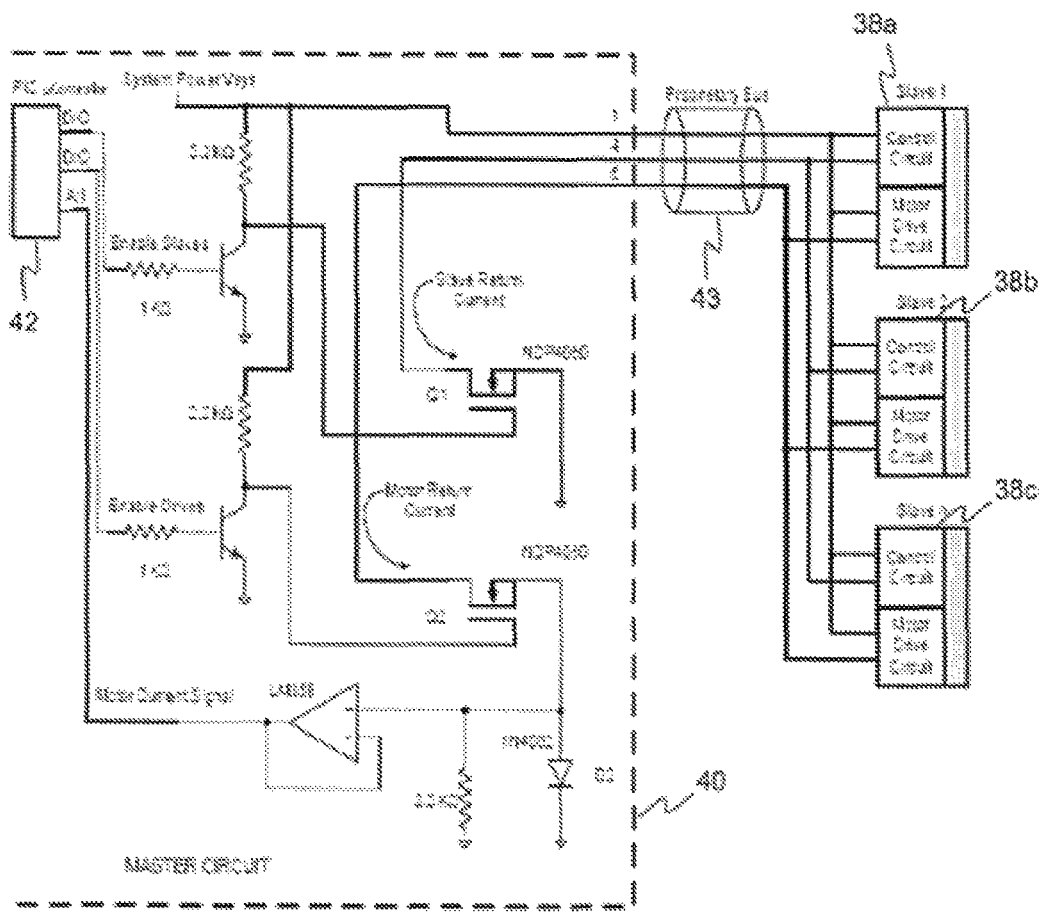
FIG. 4 shows a schematic circuit diagram for a slave monitoring circuit in accordance with an embodiment of the present invention.

As shown in FIG. 4, the master maintains control over the functioning of the slaves. Each slave control circuitry 38a, 38b, 38c of the slaves may be powered on or off by the master circuit 40. The master circuit is operable to turn the power MOSFET Q1 on or off as desired by setting the state of one of the digital outputs of the master circuit micro controller 42. Similarly the motor drive circuitry of the slaves can be enabled or disabled by turning Q2 on or off. Control of the slaves is achieved through the transmission of requests and commands between the master circuit through intermediary proprietary bus 43.

The ground return current of the motor drive circuitry of all the slaves returns to the master via the common pin 5 of the proprietary bus 42 and passes through the diode D2 before reaching the common power supply ground of the system. The voltage that is developed across D2 when any of the slaves have actuated their respective motors appears as a signal on one of the master controllers analogue inputs. This signal may be digitized by the master and compared to a threshold. The master is thereby operable to detect and measure the length of time that any of the slave motors draws current. This is a diagnostic and safety feature of the system. As an illustrative example, the algorithm required to perform this task may be the task_read_slave_return_current( ) algorithm as follows.

by the master individually addressing the slaves one at a time and commanding them to move. The master may detect whether or not the addressed blind, that is a slave, actually exists within the system based on the current consumption of the addressed slave's drive circuitry. The master achieves this detection based on the fact that only slaves which exist within the system will draw current when commanded to move.

The master may be operable to remove all power to the slaves as required, for example, such as by turning off Q1 and Q2. This allows the system to maintain a state of extremely low power consumption when no motion of the blinds or shutters is required. The circuitry of the present invention may also allow the master to "re-boot" the slaves should an error or malfunction be detected in the system.

Figure 5:
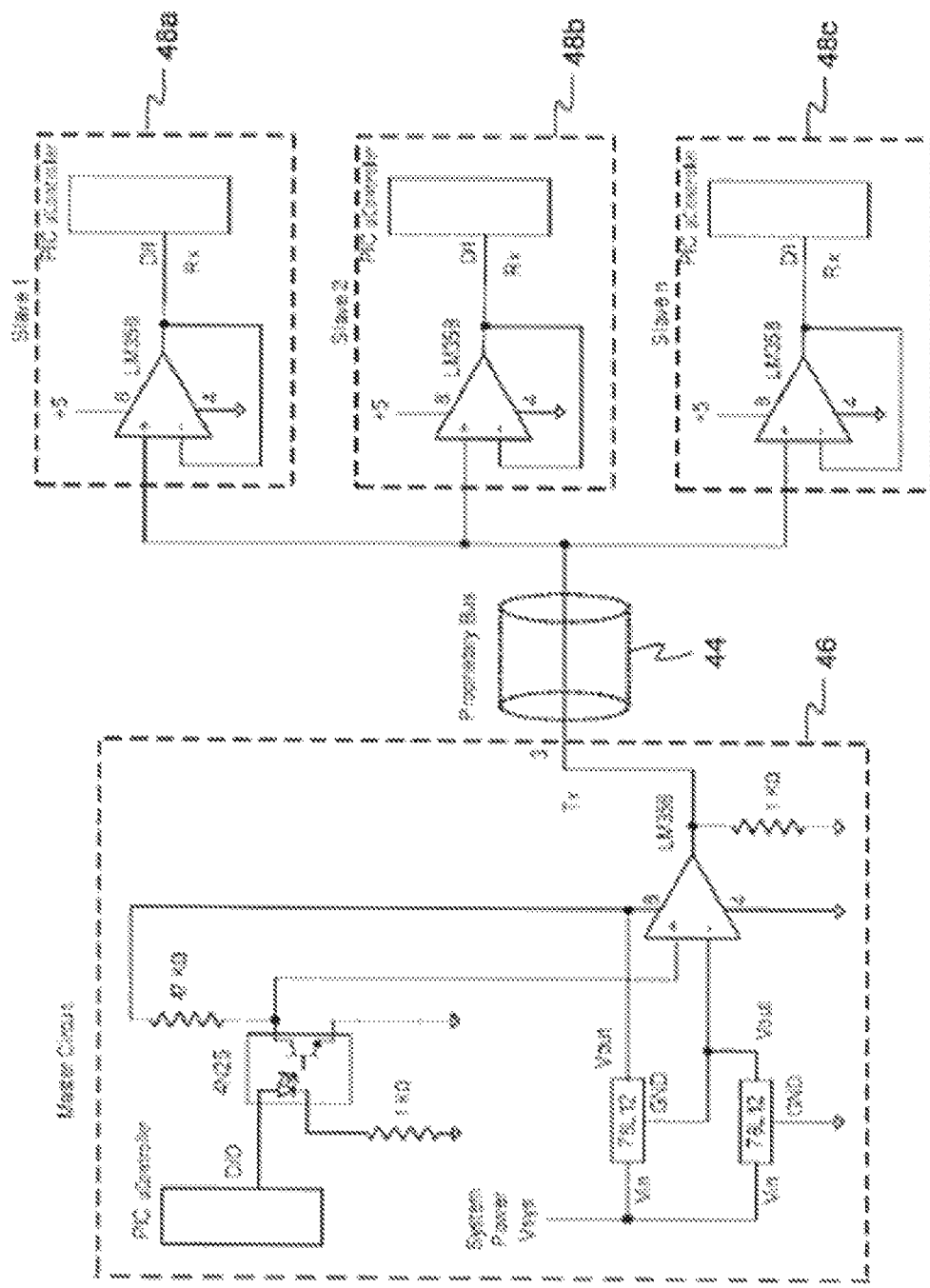
FIG. 5 shows a schematic circuit diagram of a system for master to slave communications in accordance with an embodiment of the present invention.

Communications between masters and slaves within the system may occur in accordance with the circuitry of the system. As shown in FIG. 5, in one embodiment of the present invention, the master controller 46 transmits commands over the controller proprietary bus 44 to the connected slaves 48a, 48b, 48c.

Figure 6:
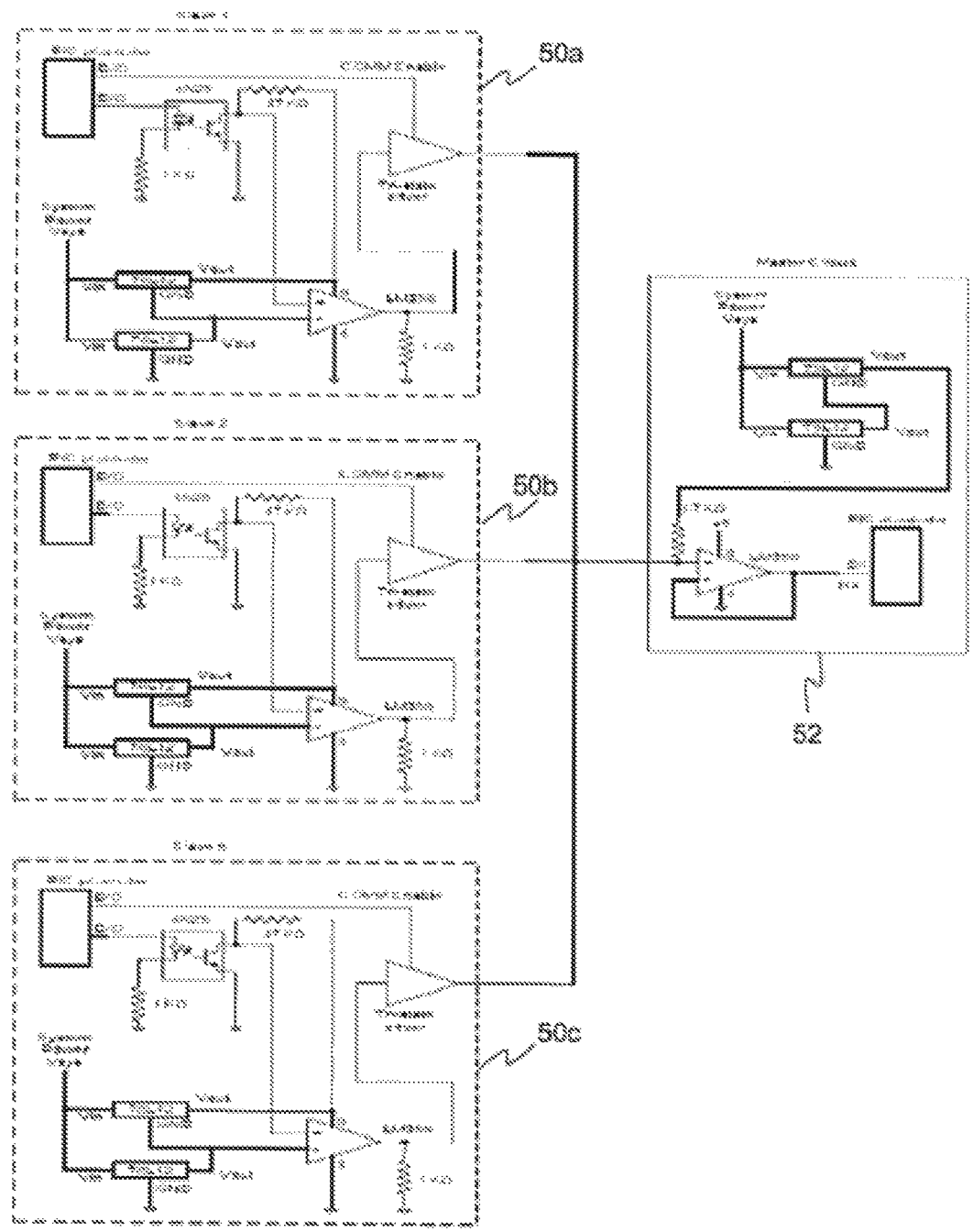
FIG. 6 shows a schematic circuit diagram of a system for slave to master communications in accordance with an embodiment of the present invention.

As shown in FIG. 6, in one embodiment of the present invention, the transmitting slaves 50a, 50b, 50c may transmit data back to the receiving master 52. The slaves may use a tri-state line driver which is normally in the high impedance state. In accordance with this embodiment, only slaves specifically requested by the master may drive the Rx line, pin 6 for a short period of time, for example, such as the Rx line, pin 6 26, as shown in FIG. 2. This operability of the system prevents communications collisions on the bus which would result if more than one slave attempted to communicate with the master at the same time.

```
task_read_slave_return_current( )
{
    slave_return_current = analogue_to_digital_conversion(motor_current_AI);   /* Read the slave motor return current */
    IF(slave_return_current > RUNNING_CURRENT) runtime = runtime + 1;          /* If any slaves are running increment
the runtime count */
    ELSEIF (runtime > 1) runtime = runtime – 2;                                /* Otherwise decrement the count at a
higher rate */
    IF( runtime > MAX_RUNTIME)
    {
        signal_system_error( );                                /* Indicate an error has occurred */
        system_error_count = system_error_count + 1;           /* Keep track of the error count */
        disable_slave_drives( );                         /* Disable the slave motor circuitry */
        disable_slaves( );                                     /* Power down the slaves */
        delay(TIMEOUT);                                        /* Allow the slaves to cool off before rebooting them */ and
        enable_slaves( );                                      /* Power the slaves back up */
        enable_slave_drives( );                                /* and enable the slave motor circuitry */
        runtime = RT_RESET;                                    /* Only a partial reset of the runtime integrator is allowed. the
system remains sensitive to faults */
    }
}
```

In an embodiment of the present invention, the master may be configured to disable the slaves if a malfunction occurs, for example, such as a short circuit. In another embodiment of the present invention, the master is provided with an indicator of system health, and the master is operable to utilize the indicator system health to detect when one or more slaves are unable to reach a requested position. By monitoring the current consumption of the slave's drive circuitry, the master is operable to stagger the operation of the blinds within the system. For example, the master is operable to command one blind to move and the master will wait until motion has ceased before commanding the next blind in the system to move. The master may also be configured to be operable auto-detect which blinds are connected within the system. Such auto-detection may occur As shown in FIG. 15, in one embodiment of the present invention, the communicating master 54 may communicate with an external device via the RS232 standard 56.

Figure 16:
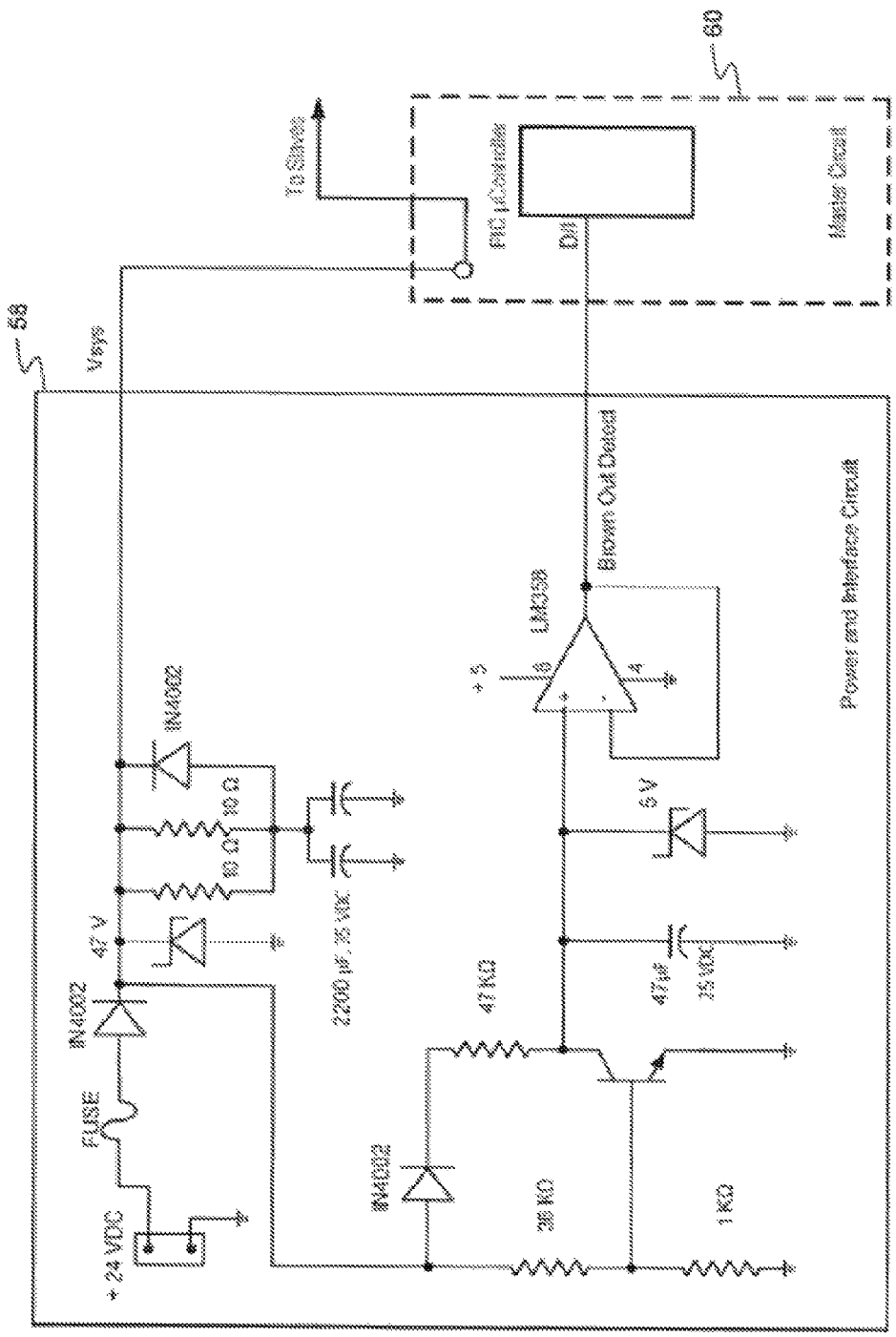
FIG. 16 shows a schematic circuit diagram of a brown out detection circuit in accordance with an embodiment of the present invention.

In an embodiment of the present invention, the system incorporates a power and interface circuit providing several functions, including conditioning incoming DC power and providing capacitive storage to reduce line voltage drops when motors are actuated. As shown in FIG. 16, in one embodiment of the present invention, the power and interface circuit element 58 may be operable to monitor the incoming DC voltage supply and to provide a signal to the controlling master circuit 60 upon detecting that the input supply has dropped below a threshold. The master in turn is operable to read this signal as a digital input and to commands one or more of the slaves to enter a sleep mode before being subsequently powered down by the master. For example, such as by turning off Q1 and Q2. This function allows the components of the system to enter a state of quiescence when power loss is beginning to occur.

Figure 15:
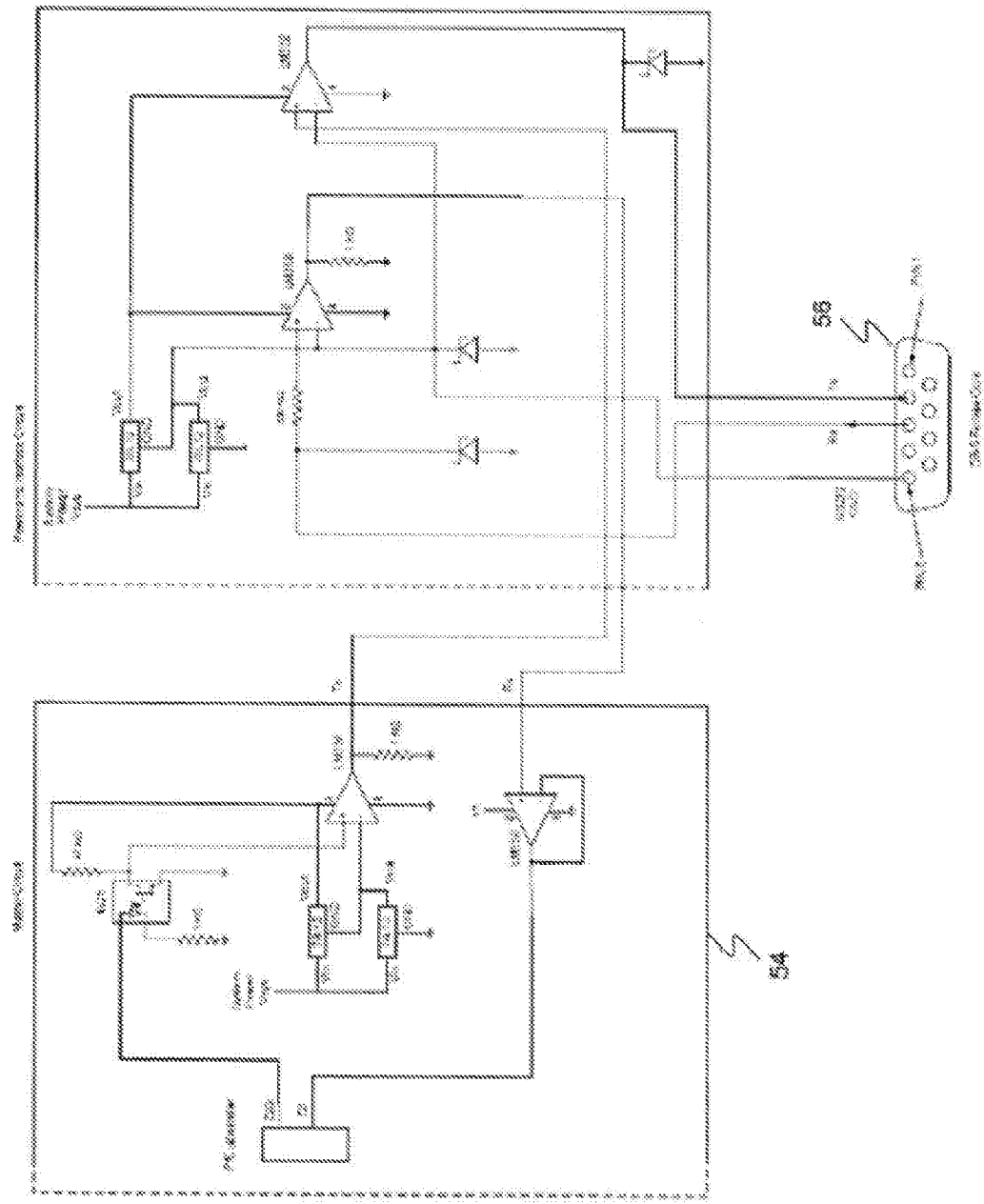
FIG. 15 shows a schematic circuit diagram of the system's connection to external communications in accordance with an embodiment of the present invention.

In another embodiment of the present invention, the power and interface circuit provides the interface and isolation of the RS232 communications between the master and an external device, as shown in FIG. 15.

Figure 17:
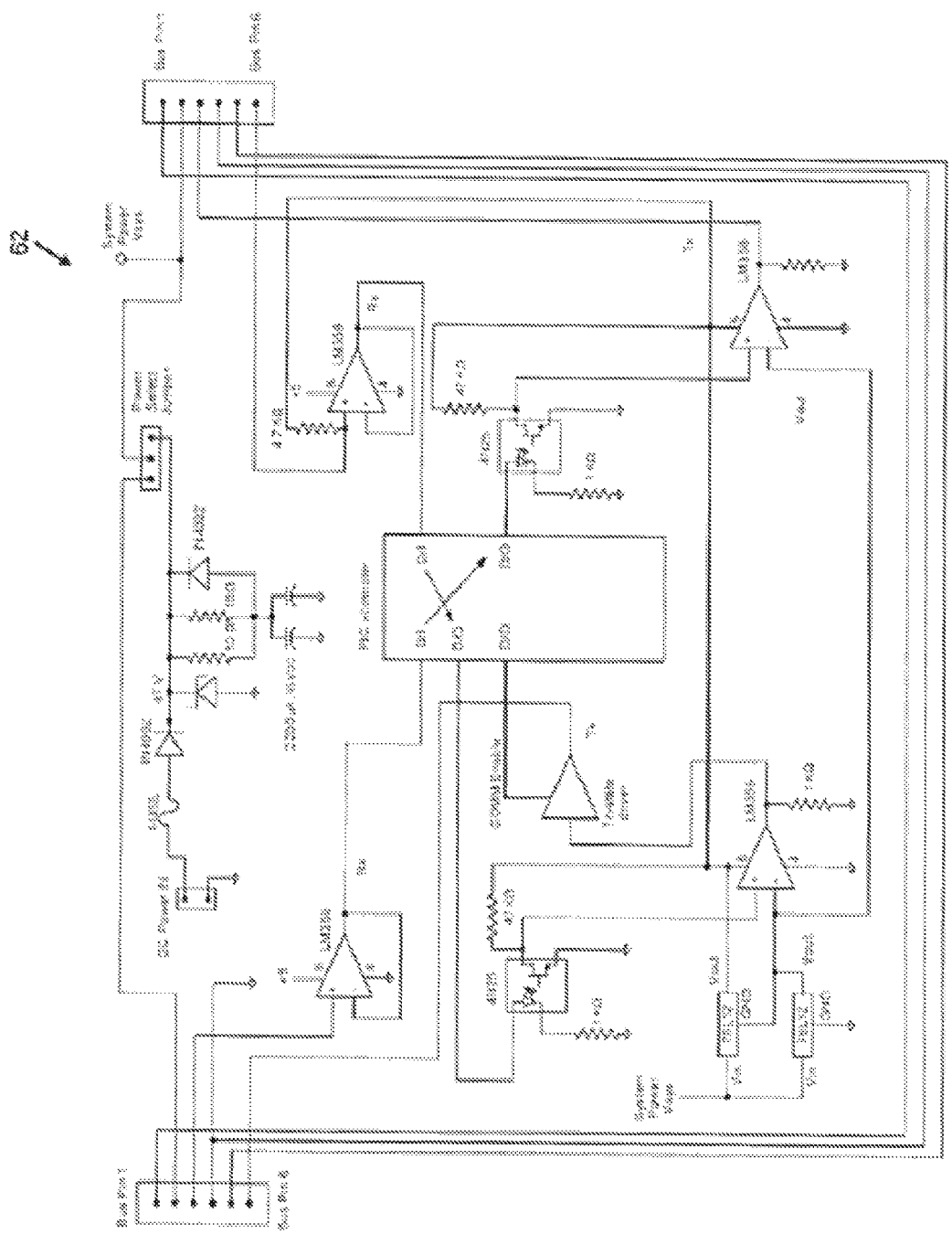
FIG. 17 shows a schematic circuit diagram of a bus repeater circuit in accordance with an embodiment of the present invention.

As shown in FIG. 17, in one embodiment of the present invention, a bus repeater circuit 62 is operable to provide a unique configuration of many of the circuit elements already described herein. The purpose of this aspect of the system is to extend the length of the proprietary bus for the system. In some applications of the present invention, slaves within the system may be found at a long distance from the power supply source, as well as a long distance from the master. Line voltage drops as well as communications errors may result. These problems are addressed in part by the application of the bus repeater. The bus repeater can be placed anywhere within the system as required.

In an embodiment of the present invention, the microcontroller is operable to read incoming and outgoing communications, for example, such as by Rx and Tx on pins 6 and 3 respectively of the proprietary bus, with respect to the master. All of the microcontrollers within the system may utilize an enhanced communications calculation or algorithm that is operable to allow for the correct determination of data bits even in an environment of low signal to noise ratios. For example, such an enhanced calculation or algorithm may be the algorithm, receive_char( ) as follows:

In an embodiment of the present invention, each slave in the system may be a device that is operable to control the angles of its corresponding slats and to thereby regulate the transmission of sunlight into an interior space. The two devices which may be incorporated in the invention as slaves are blinds and shutters. A skilled reader will recognize that blinds and shutters function in almost an identical manner. Differences between the two devices are limited to the mechanical linkage of the motor to the slats.

Figure 7:
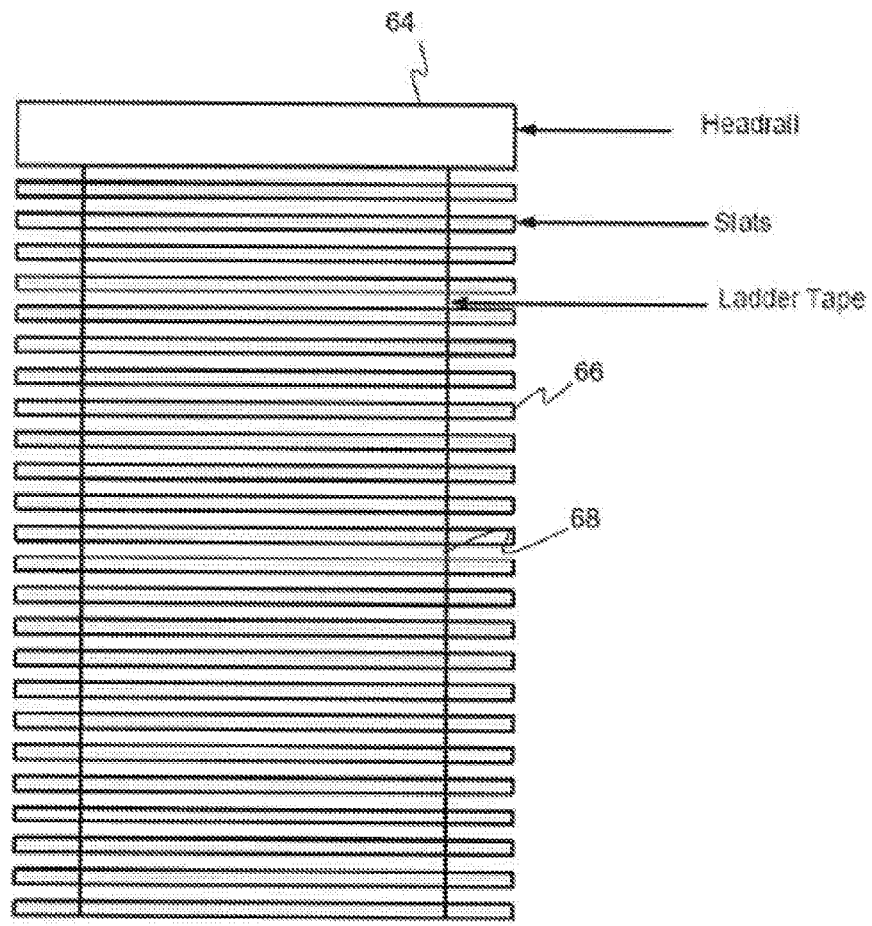
FIG. 7 shows an illustrative example of a prior art COTS venetian blind.

As shown in FIG. 7, a conventional COTS venetian blind comprises a COTS headrail 64, COTS multiple slats 66, and COTS ladder tape 68 extending between the slats. As shown in FIG. 8, one embodiment of the present invention may be configured so that elements are connected together inside the system headrail 71 of the blind. Such elements may include a motor 70, a motor coupling 72, a ladder tape roll 74, ladder tape strings 76, a position sensor 78, a ladder tape roll support 80, a tilt rod 82, set screws 84 and a motor bracket. The configuration of the system elements is such that the microcontroller is operable to actuate the motor which is coupled to a tilt rod. Actuating the motor serves to rotate the tilt rod which subsequently begins to spool the ladder tape string on one side of the blind and unspool the ladder tape string on the other side. This serves to tilt the slats of the blind towards a closed or open position depending on the direction of rotation of the motor.

The position of the slats is detected by the application of the position sensor which provides the microcontroller with the means of detecting and controlling the current position of the slats.

```
receive_char( )
{
  comm_byte = 255;                        /* Initialise the received data to an irrational value */
  start_timer( );                         /* Initialise the timer */
  WHILE(RXB == 0)                         /* Wait until the communications D/I input is high - start bit */
  {
  IF (timer > START_DELAY) exit;          /* We have waited too long for the start bit; exit */
  }
  start_timer( );                         /* Re-initialise the timer */
  WHILE(timer < HALF_BIT);                /* We have received the start bit, wait here for the first data bit */
  FOR( j=0; j<8; j++)                     /* We can now collect the data. We need to fetch 8 bits */
  {
    lo_bit = 0;                           /* Initialise the bit counters */
    hi_bit = 0;
    FOR(i=0; i< BIT_TIME; i++)            /*Read the comm D/I continually for the entire bit time */
        {
        IF(RXB == 1) hi_bit = hi_bit + 1; /* Count the number of instances of high and low states for the comm D/I */
        ELSE lo_bit = lo_bit + 1;
        }
    IF    ( ( hi_bit/lo_bit) > NOISE_RATIO )       /* Is this a valid 1 bit? */
        comm_byte = (comm_byte OR 10000000b);      /* If so place a 1 in the received char MSB */
    ELSEIF ( ( lo_bit/hi_bit) > NOISE_RATIO )      /* Is this a valid 0 bit? */
        comm_byte = (comm_byte AND 01111111b);     /* If so place a 0 in the received char MSB */
    ELSE return(255);                              /* The transmission is too noisy so abort and return with an
irrational value */
    IF ( j <> 7) comm_byte = comm_byte >> 1;       /* Shift the received bit one place to the right unless it is the last
                                                   bit
received */
  } /* End of FOR loop */
  return(comm_byte);                      /* Successful reception of a byte of data, return it */
} /* End of receive_char( ) function */
```

This algorithm may be utilized by the slaves, the master and the bus repeater. Thus, the bus repeater may be operable to detect attenuated and noisy communication signals and to re-transmit them with full strength and clarity thereby extending the range of the system. The bus repeater may also be operable to allow the injection of DC power into the system to overcome line losses which may occur over long distances when motors are actuated.

Figure 9:
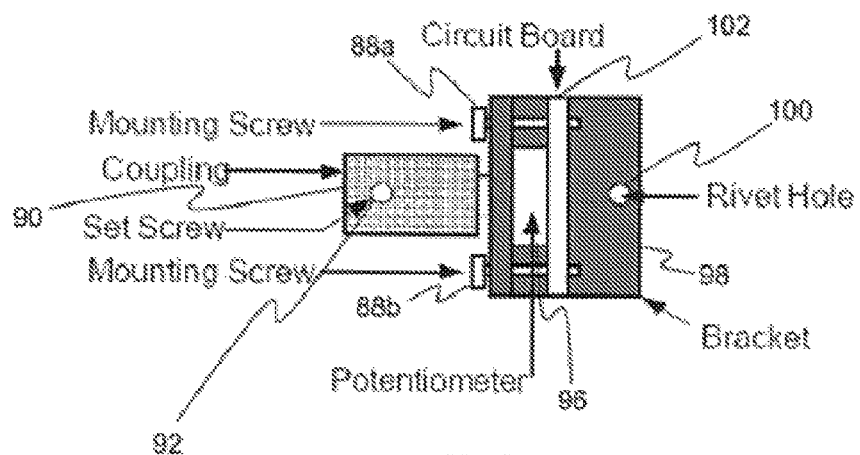
FIG. 9 shows a top view of a position sensor in accordance with an embodiment of the present invention.

As shown in FIG. 9, in one embodiment of the present invention the position sensor comprises sensor mounting screws 88a, 88b, a sensor coupling 90, a sensor set screw 92, a potentiometer 96, a sensor bracket 98, a sensor rivet hole 100, and a circuit board 102.

Figure 10:
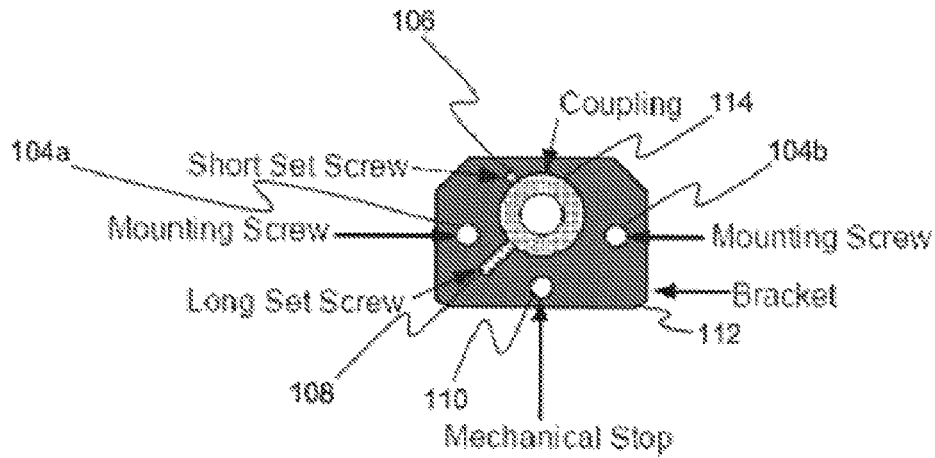
FIG. 10 shows a front view of a position sensor in accordance with an embodiment of the present invention.

As shown in FIG. 10, in one embodiment of the present invention, the position sensor comprises position sensor mounting screws 104a, 104b, a short set screw 106, a long set screw 108, a mechanical stop 110, a position sensor bracket 112, and a position sensor coupling 114.

Figure 11:
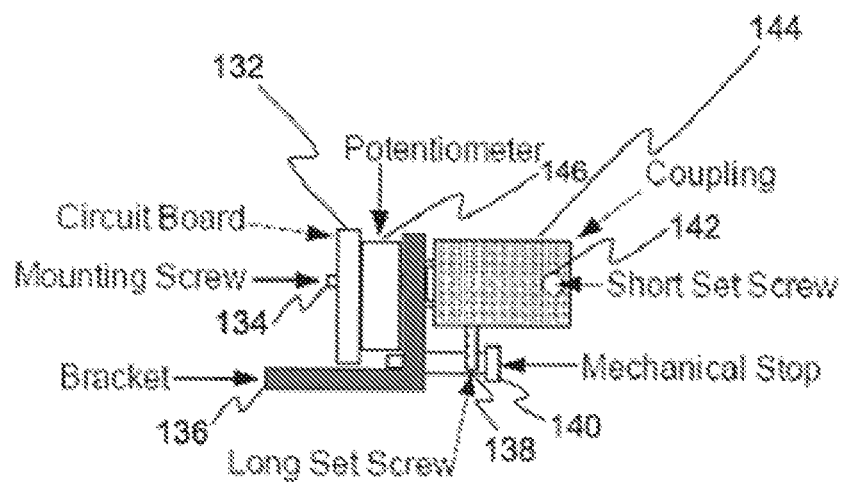
FIG. 11 shows a side view of a position sensor in accordance with an embodiment of the present invention.

As shown in FIG. 11, in one embodiment of the present invention, the position sensor comprises a sensor circuit board 132, a potentiometer mounting screw 134, a potentiometer bracket 136, a sensor long set screw 138, a sensor mechanical stop 140, a sensor short set screw 142, a potentiometer coupling 144 and a sensor potentiometer 146.

Figure 14:
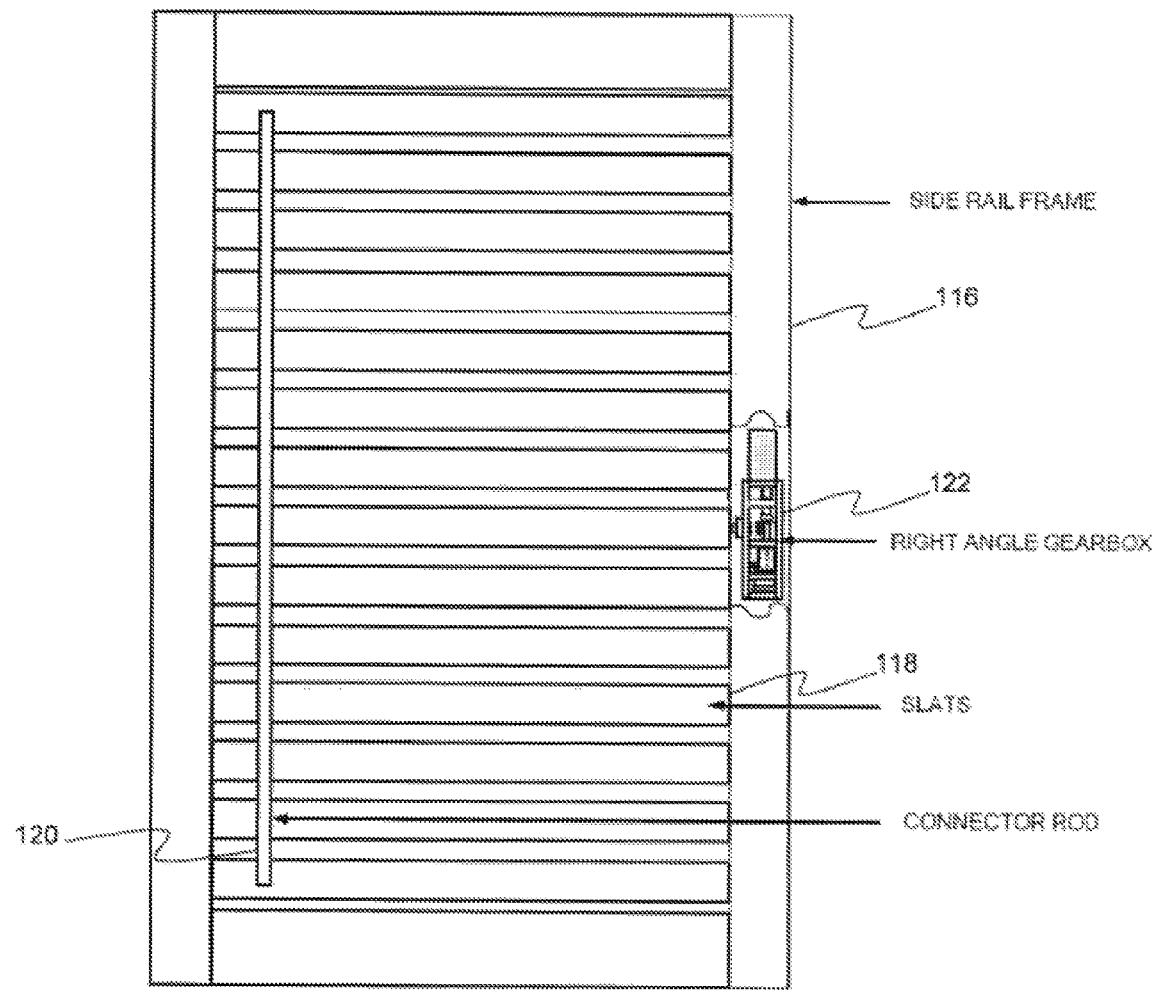
FIG. 14 shows an illustrative example of a shutter with a gearbox installed in accordance with an embodiment of the present invention.

As shown in FIG. 14, one embodiment of the present invention may integrate a COTS shutter and elements of the system may be positioned inside the siderail frame 116 of the COTS shutter. This embodiment of the present invention further comprises slats 118, a connector rod 120 and a right angle gearbox.

Figure 12:
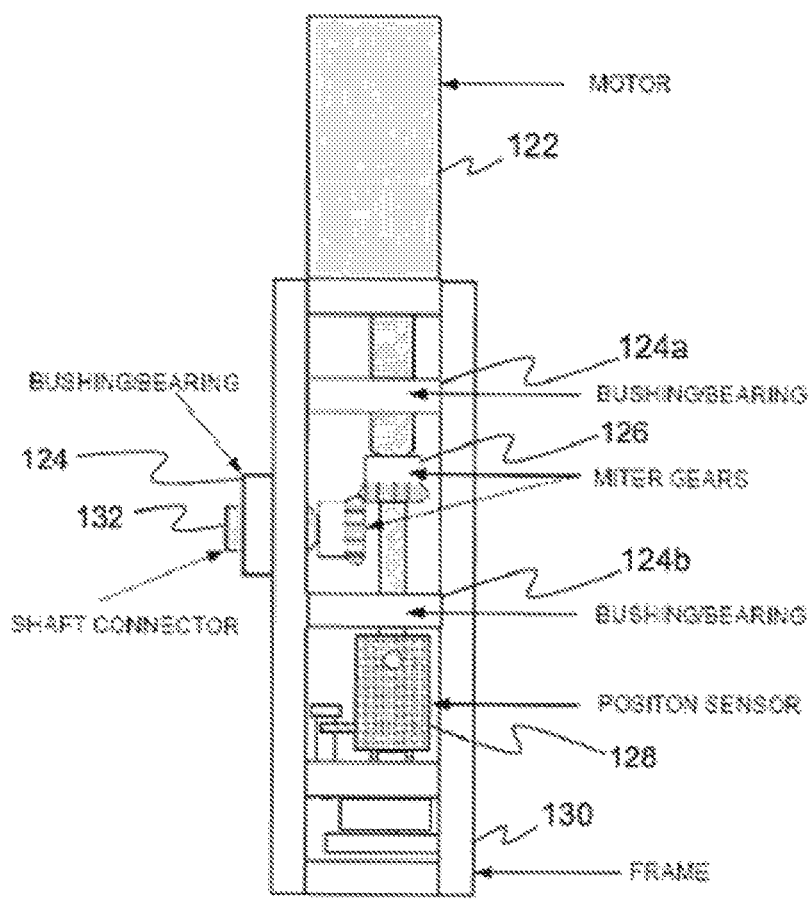
FIG. 12 shows a right angle shutter gearbox in accordance with an embodiment of the present invention.

The right angle gearbox may further comprise bushings/bearings 124a, 124b, 124c, miter gears 126, a position sensor element 128, a frame 130, a shaft connector 132 and a motor 122, as shown in FIG. 12. The right angle gearbox is operable to provide a right angle translation of the motor motion.

Figure 13A:
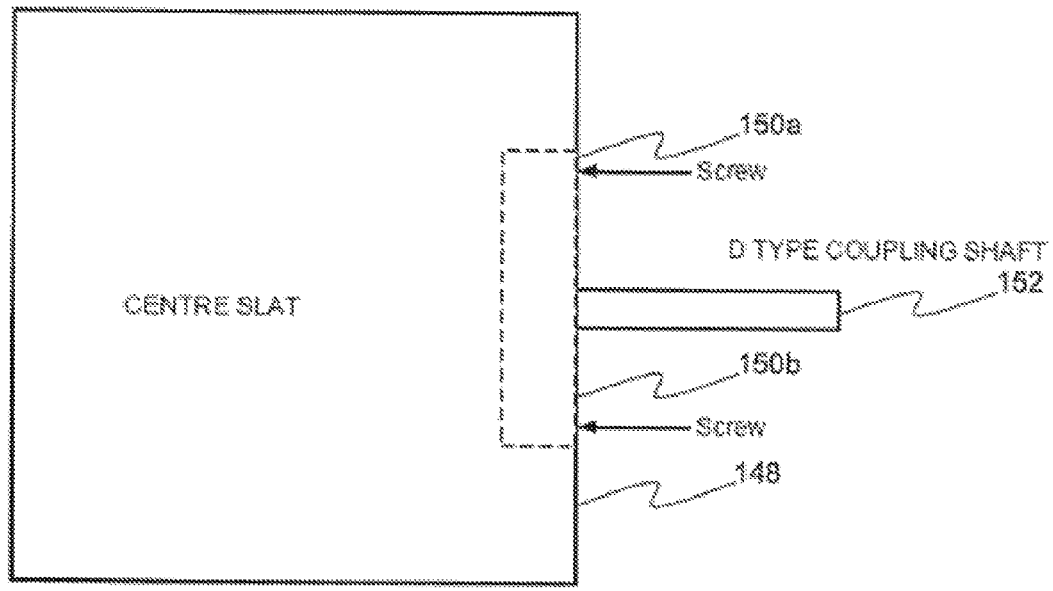
FIG. 13a shows side view of a shutter coupling apparatus in accordance with an embodiment of the present invention.
Figure 13B:
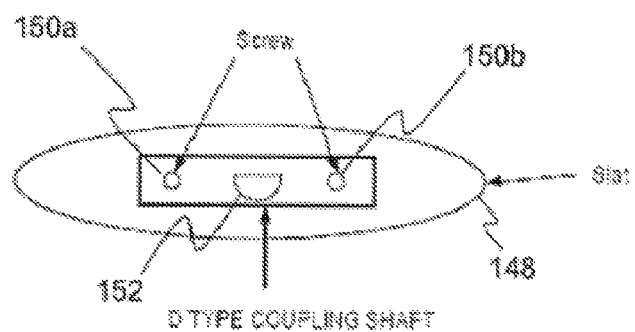
FIG. 13b shows front view of a shutter coupling apparatus in accordance with an embodiment of the present invention.
Figure 13C:
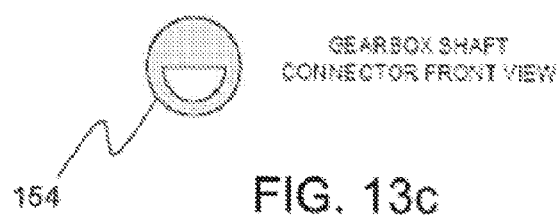
FIG. 13c shows front view of a gearbox shaft connector in accordance with an embodiment of the present invention.

In one embodiment of the present invention, as shown in FIGS. 13a, 13b and 13c, the centre slat 148 of the shutter in a blind may house a shaft, for example, such as a D type coupling shaft 152, or a specialized D-shaft, which inserts into the gearbox shaft connector 154. Screws 150a, 150b may hold the D type coupling shaft in place in the centre slat. The position sensor may be coupled directly to the motor, as in the case of venetian blinds. Rotation of the motor operates to alter the angular position of the centre slat as well as all the other shutter slats. The position of all of the shutter slats is altered because all of the shutter slats connected by a stiff connector rod, for example, such as is commonplace in COTS shutters. The present invention may be configured so that in all other aspects control of the slat position is identical to that of venetian blinds.

Control of the slat angles requires position feedback from the position sensor. The position sensor may be mounted within the headrail of a venetian blind and be directly coupled to the motor via the tilt rod. In the case of shutters, the position sensor may be mounted within the right angle gearbox and directly coupled to the motor.

Figure 19:
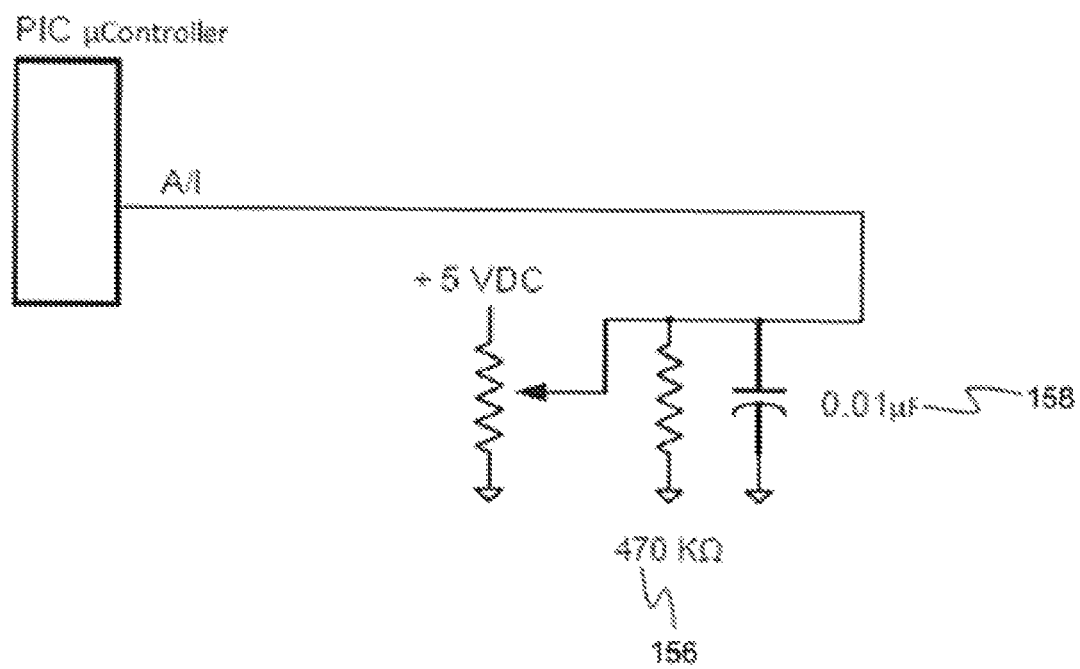
FIG. 19 shows a schematic circuit diagram of a position sensor circuit in accordance with an embodiment of the present invention.

In an embodiment of the present invention, the position sensor includes a long life potentiometer connected in a voltage divider circuit, as shown in FIG. 19. The shaft of the potentiometer is mechanically connected to the motor such that rotation of the motor creates a change in the voltage produced by the circuit. The circuit also includes filter elements such as a 470 kilo ohm resistor 156 and 0.01 microfarad capacitor 158 which are physically separate from the position sensor and mounted on the slave circuit board which includes the slave microcontroller. The microcontroller is operable to read the voltage produced by the circuit and to digitize the voltage through an integral analogue to digital converter that generates a digital representation of the slat angle.

The resistor in the circuit may also be operable to produce a 0.0 volt signal, should the potentiometer be disconnected from the circuit. This provides the slave with an error indication that may be utilized as a self defence mechanism, as discussed herein.

The mechanical structure of the position sensor is such that voltages produced by normal slat angles between fully opened and fully closed lie within a rational range, for example, such as 1.2 volts to 3.7 volts, which is slightly less than the full scale range of 0 to 5 volts. The microcontroller is operable to detect voltages outside this range as errors and to operate so as to take appropriate action when errors are detected. This operability of the system protects the system from failures of the potentiometer or incorrect installation.

The position sensor also includes a long set screw which serves to fix the potentiometer shaft to the mechanical coupling and to provide a hard mechanical stop in the event of a total system error. The set screw will contact the mechanical stop, as shown in FIGS. 10 and 11, should the motor be actuated without the normal algorithmic controls provided by the microcontroller. This prevents the blind from destroying itself in the event of a failure. During a failure mode, the motor will stall out against the mechanical stop which will cause the fuse in the slave drive circuit to cut power to the motor. The master is operable to detect the failure mode of the system and the system may be recoverable depending on the root cause of the failure.

Figure 18:
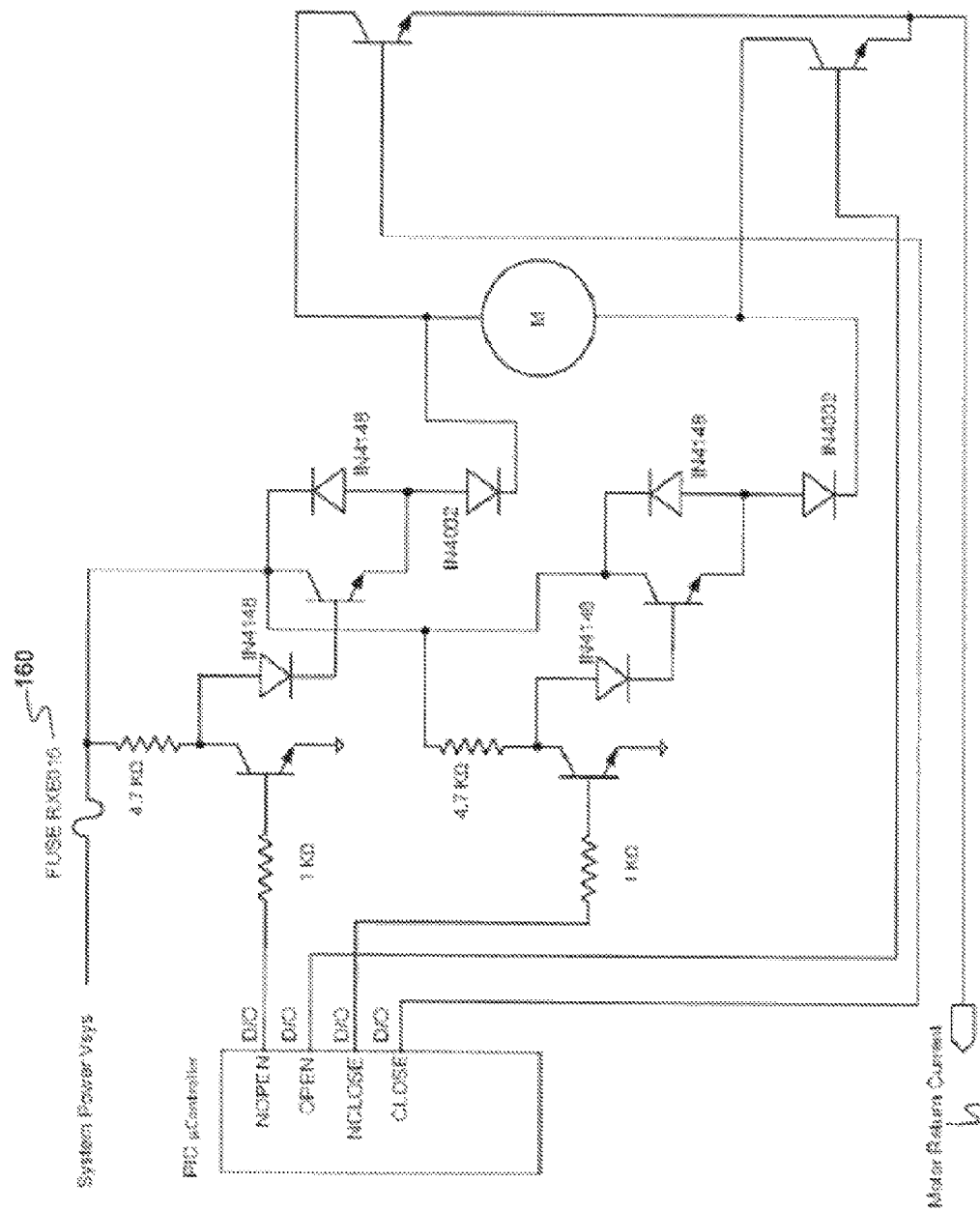
FIG. 18 shows a schematic circuit diagram of a slave drive circuit in accordance with an embodiment of the present invention.

In one embodiment of the present invention, the slave drive circuit may be a RXE015 160, as shown in FIG. 18.

As shown in FIG. 20, one embodiment of the present invention may incorporate a 0 to 10V conversion module circuit that is operable to provide a means of implementing a fully isolated interface between the present invention and analogue signals provided by an external device, for example, such as a lighting control system. The external device provides a DC input voltage of 13 VDC to 30 VDC to power the circuit. A 0 to 10 volt analogue input is converted by means of the circuit which includes the LOC110 opto-isolator, to a 0 to % VDC signal which is converted to a digital value by the microcontroller. The microcontroller interprets this signal as a position command and forms the correct command protocol which is sent to the master via the external RS232 port. A second input signal is also optically isolated by 4N25 device and this signal functions as a digital input to the microcontroller to indicate whether fast or slow motion is desired. In this manner, the external device can request all blinds within the system to move at either high or low speed to achieve a desired slat angle position. Thus the requested position is represented by the analogue voltage input by the external device. Although the device can accept input voltages between 0 and 10 V, the full scale position range of the blinds is represented by voltages between 2.6 volts (fully open) and 7.4 volts (fully closed). The requested slat position between these two voltage limits is linearly related to the input voltage (e.g. 4.8 volts indicates a position request of 50% open etc.) By limiting the rational range of the input signal, the device can determine if the input signal is connected or not and can detect errors in the input signal.

Description of Software Algorithms

In one embodiment of the present invention, calculations or algorithms utilized in the system may be written in a C like language, as shown herein in order to present such calculations and algorithms in a format that is easily readable. A skilled reader will recognize that the calculations and algorithms may be written in other languages and that other calculations and algorithms than those included herein may be incorporated in the system to achieve the present invention. For example, the code of the calculations and algorithms could be implemented in any language including the native assembler of the target microprocessor. Since the written descriptions of calculations and algorithms provided herein are not intended for actual compilation, strict adherence to the C standard is not observed and in some cases may be replaced with a more readable English language convention.

Master Algorithms

The master microprocessor may incorporate computer program code that is software operable for scheduling periodic tasks. As an example, the master microprocessor may incorporate master algorithms that incorporate the task_read_slave_return_current( ) algorithm, such as follows:

| | | | |
|---|---|---|---|
| #define | RUNNING_CURRENT | 25 | /* If any slave are running the return current will exceed 0.5 volts */ |
| #define | MAX_RUNTIME | 5 seconds | /* The maximum integrated value of runtime allowed for the slaves */ |
| #define | TIMEOUT | 16 seconds | /* The amount of time slaves drives should be disabled on a system error */ |
| #define | RT_RESET | 100 | /* The value for a partial reset of the runtime integrator */ |

The following is task is executed periodically as scheduled by the Master executive task scheduler.

```
task_read_slave_return_current( )
{
   slave_return_current = analogue_to_digital_conversion(motor_current_AI);     /* Read the slave motor return current */
   IF(slave_return_current > RUNNING_CURRENT) runtime = runtime + 1;            /* If any slaves are running increment
the runtime count */
   ELSEIF (runtime > 1) runtime = runtime - 2;                                  /* Otherwise decrement the count at a
higher rate */
   IF( runtime > MAX_RUNTIME)
   {
      signal_system_error( );                           /* Indicate an error has occurred */
      system_error_count = system_error_count + 1;      /* Keep track of the error count */
      disable_slave_drives( );                       /* Disable the slave motor circuitry */
      disable_slaves( );                                /* Power down the slaves */
      delay(TIMEOUT);                                   /* Allow the slaves to cool off before rebooting
                                                           them */ and
      enable_slaves( );                                 /* Power the slaves back up */
      enable_slave_drives( );                           /* and enable the slave motor circuitry */
      runtime = RT_RESET;                               /* Only a partial reset of the runtime integrator is
allowed. the system remains sensitive to faults */
   }
}
```

This task_read_slave_return_current( ) algorithm reads the analogue input signal created by the circuit, for example, such as is shown in FIG. 4. All current flow which passes through the slave motor drive circuits, for example, such as the motor return current 162 as shown in FIG. 18, flows through the diode D2 and creates a voltage seen by the microprocessor. This voltage is digitized by a routine, for example, such as the analogue_to_digital_conversion( ) algorithm.

If the voltage exceeds a set level (here defined as the constant RUNNING_CURRENT) then one or more of the slaves has actuated its motor and a count (runtime) is incremented by 1. If the voltage is less than RUNNING_CURRENT then the count runtime is decremented by 2 but is not allowed to become negative. This algorithm acts like an integrator circuit which charges up at a rate proportional to the task scheduling but which discharges at a higher rate. Precise behaviour of the system can be achieved by manipulating the rate at which the task is scheduled and by altering the incrementing (+1) and decrementing (-2) constants. The desired outcome is that the system allows normal short running times for all of the slaves in the system but does not allow for long protracted periods of current draw which could occur due to a malfunction of one of the slaves, a short circuit or because a blind has become stuck. If the count (runtime) exceeds a set value (here defined as MAX_RUN-TIME), a system error is deemed to have occurred and the following action is taken:

(i) The system error is communicated (signal_system_error( ) by turning on a LED on the front panel of the master.

(ii) A count (system_error_count) is kept of the number of system errors and this count is incremented. system_error_count can be accessed by querying the master from the external RS232 port. This count provides an indicator of system health.

(iii) The slaves are completely powered down by turning off Q1 and Q2, for example, such as is shown in FIG. 4. They are kept powered down for a pre-determined time period (here defined as TIMEOUT) to allow the slave drive circuitry to 'cool off'. After the time period has expired, the slaves are powered back up and the slave drive circuitry is re-enabled. The rebooting process of the slaves may in some cases clear errors which could occur due to line spikes or other electrical interference inducing a latch-up state for one of the slave's microprocessors.

(iv) Despite the fact that no motors have run for some time, the integrator function is not permitted to decline to zero but is reinitialised to a set value (here defined as RT_RESET). This keeps the system in a sensitive state so that, if the error persists, the system will quickly reach the level which triggers a system error and the slaves will again be disabled. However, the integrator will eventually decline to zero if error-free conditions persist, allowing the system to return to a normal desensitized state.

(v) This algorithm can, in many cases clear error states which would otherwise completely disable the system or which could cause unacceptable loading of the power supply and excessive long term current flow over the proprietary bus.

Slave Algorithms

In one embodiment of the present invention, slave calculations or algorithms are incorporated in the system. An example of a general slave algorithm includes the following:

regularity and provides the system with the means to accurately gauge periods of real time.

The ISR (interrupt service routine) is automatically called by hardware when the interrupt occurs. If the interrupt is due

```
#define  PW              2.5 seconds   /* The maximum time the motor can be energized for one pulse */
#define  REVERSE         0.5 seconds   /* The amount of time the motor will be energized while
reversing if stuck*/
#define  CREEP           0.1 seconds   /* The amount of time the motor will be energized when irrational */
#define  HIGH            0.5 msec      /* The delay between motor pulses for fast motion */
#define  LOW             10.24 msec    /* The delay between motor pulses for slow motion */
#define  START_DELAY     1.284 msec    /* The amount of time we can wait for the communications start bit */
#define  BIT_TIME        nnnn          /* Defines the time between bits at specified baud rate and given processor
speed */
#define  HALF_BIT        nnnn          /* The length of time to wait after the start bit before the first data bit */
#define  NOISE_RATIO     1.5           /* The minimum ratio of hi and lo bit states deemed acceptable for a
comm bit reception to be valid */
#define  CREEP_TRIES     5             /* The number of attempts at creeping towards rational range before a
position change must be detected */
#define  SLAVE_ID_U      'X'           /* A unique identifier for this slave within the system, indicating fast
motion */
#define  SLAVE_ID_L      'x'           /* A unique identifier for this slave within the system, indicating slow
motion */ 1
#define  STUCK           1
#define  BADSENSOR       2
#define  NOSENSOR        3
#define  OPENING         0
#define  CLOSING         1
#define  STAGGER         4             /* Used to stagger the start delay after receiving a master command */
#define  IRR             255           /* Flag if position sensor reacing is not between SENSOR_MAX_LO
and SENSOR_MAX_HI */
#define  SENSOR_MAX_HI   240           /* Maximum rational position sensor reading */
#define  SENSOR_MAX_LO013              /* Minimum rational position sensor reading */
#define  MAXOPEN         065           /* The maximum open position for the blind */
#define  MAXCLOSE        190           /* The maximum closed position for the blind */
#define  DEADBAND        005           /* Position tolerance for master position requests */
char command_str[4];                   /* Three characters plus a temination character to hold master
commands from the communications port */
```

ISR( )

An example of an ISR( ) algorithm incorporated in an embodiment of the present invention is as follows:

to a communications interrupt, the routine receive_char( ) is called three times to receive the master's command string and a flag is set (MASTER_REQUEST) to indicate that a

```
ISR                                    /* The interrupt service routine services communications and internal timer
interrupts */
{
  IF(INTC == 1)                        /* Check hardware bit to determine if it is a communications interrupt */
  {
    command_str[0] = receive_char( );  /* If so read the 3 characters from the commmunications port */
    command_str[1] = receive_char( );
    command_str[2] = receive_char( );
    command_str[3] = 0;                /* Terminate the command string with a zero */
    MASTER_REQUEST = 1;                /* set a flag to indicate that we have a command from the master */
  }
  IF(INTT == 1)                        /* Check hardware bit to determine if it is a timer interrupt */
  {
    timer = timer + 1;                 /* If so increment the timer */
  }
} /*End of interrupt service routine */
```

The slave microprocessor includes a real-time hardware interrupt which can be triggered for two reasons: (1) a start bit (rising edge) has occurred on one of the digital input pins designated as the communication port—in this case a hardware bit (here named INTC) is set and can be polled by the software; or (2) the real-time counter has overflowed—in this case a hardware bit (here named INTT) is set and can be polled by the software, and this event occurs with fixed request is pending. The command string will reside in the string command_str. If the interrupt is due to the real time counter overflowing, the timer variable (timer) is simply incremented to register this event.

main( )

An example of a main( ) algorithm incorporated in an embodiment of the present invention is as follows:

```
main( )
{
enable_comm_interrupts( );                                              /* Prepare to receive master commands */
enable_timer_interrupts( );                                             /* Allow real-time timer interrupts */
WHILE(1)
   {
   MASTER_REQUEST = 0;                                                  /* Clear the master request flag */
   target = wait_for_master_request( );                                 /* Wait for a Master position request */
   IF (target <> IRR)                                                   /* If a valid position request has been
made, execute it */
      {
      delay(( SLAVE_ID_U – 84) * STAGGER)                               /* Algorithm to calculate start delay
based on slave ID */
      last_position = read_position_sensor ( );                         /* Check the current position by reading
sensor A/D converter */
      IF(( last_position – target) > DEADBAND) open_blind(target);      /* If new request exceeds tolerance then open
blind to target */
      ELSE IF (( target – last_position) > DEADBAND) close_blind(target); /* If new request exceeds tolerance then close
blind to target */
      }
   }
} /* End of main loop */
```

This is the main loop of the slave software and it is executed continuously while the slave is powered up. The slave first enables and allows both communications and timer interrupts by the setting of hardware bits internal to the microprocessor. Next, the execution enters an endless loop which can only be interrupted by a hardware interrupt (at which time ISR( ) is called). This loop clears the flag MASTER_REQUEST to indicate no requests are pending and then proceeds to wait for a master command string by calling the routine wait_for_master_request( ) which is described below. This routine will normally return a valid position request which now becomes the target position to which the slave must endeavour to move. If there was an error in the request, the routine wait_for_master_request( ) will flag the returned value as irrational (here defined as 255 by the constant IRR). In this case the flag MASTER_REQUEST will be cleared and the software will wait for the next request. However, if a rational target was returned the following tasks are performed:

- A wait loop is entered and the length of the delay is calculated by an algorithm which includes as a factor, the slave identification (here defined as one of the letters of the alphabet, 'X' in this example). Since all the slaves within the system have a unique identification, each slave will remain idle for a slightly different time period. In the cases where all of the slaves within the system are commanded to move at once, this algorithm implements a staggered actuation of the slave motors, thereby reducing peak current draw on the system as subsequent motors are not actuated until the peak current draw of the previous motor has subsided (motor current draw reduces substantially once the motor begins to turn). By reducing peak current draw a smaller power supply can be utilized and low voltage easy to connect small gauge wiring can be used in the system—this makes the system simpler to install.
- The current slat angle is determined by reading the position sensor (read_position_sensor( ) is described below). This position is assigned to the variable last_position.
- If the requested target position (target) is close to the current slat angle (last_position) then no motion is undertaken. For this purpose a deadband is established, here defined as 5 digital counts by the constant DEADBAND. (The use of the deadband allows the system to always come to rest and to prevent it from continually hunting and pecking in an effort to achieve a position that proves elusive. For example, overshoot the position in one direction, reverse and then overshoot in the other direction, reverse, etc. As long as the position is more less what is requested the slave will quit trying to position the slat angle.) Otherwise the target position is compared to the current position and a determination is made as to whether the blinds should be opened or closed to achieve the requested position. Once determined, the appropriate routine, open_blind( ) or close_blind( ) is called to do so.

wait_for_master_request( )

An example of a wait_for_master_request( ) algorithm incorporated in an embodiment of the present invention is as follows:

```
wait_for_master_request( )
{
   WHILE(MASTER_REQUEST == 0);           /* Wait here until a command has been received by the ISR routine */
   SWITCH (command_str[0])               /* Check the first character */
      {
      CASE 'G':                          /* Is it the global fast command ? */
         speed = HIGH;
         target = convert_to_binary(command_str[1], command_str[2]);    /* Convert the ASCII string to a binary target */
         break;
      CASE 'g':                          /* Is it the global slow command ? */
         speed = LOW;
         target = convert_to_binary(command_str[1], command_str[2]);    /* Convert the ASCII string to a binary target */
         break;
      CASE SLAVE_ID_U:                   /* Is this slave being addressed for fast motion */
         speed = HIGH;
         target = convert_to_binary(command_str[1], command_str[2]);    /* Convert the ASCII string to a binary target */
         break;
```

```
        CASE SLAVE_ID_L:                              /* Is this slave being addressed for slow motion */
            speed = LOW;
            target = corvert_to_binary(command_str[1], command_str[2]);    /* Convert the ASCII siring to a binary target */
            break;
        CASE 'S':                                     /* Is it the sleep command */
            sleep( );                                 /* yes: go to sleep */
            break;
        DEFAULT:                                      /* Must not be a valid command string */
            target = IRR;                             /* Flag it as a bad command string */
            break;
    } /* End of SWITCH */
    return(target);
}
```

This routine is called from main( ). It waits indefinitely (WHILE(MASTER_REQUEST==0)) until the flag MASTER_REQUEST has been set by the ISR( ) routine in response to the reception of a master command string. Once the flag has been set, the first character in the string is analyzed and the appropriate action is taken:

Case 'G': The first character is a 'G' and this indicates that this is a global command and that therefore all slaves in the system are requested to move to the target position. Since the first character is in upper case, the slaves are requested to move at high speed. The speed variable is set to high, (speed=HIGH). The actual target position is represented by the next two characters in the command string (command_str[1] and command_str[2]) which are in an ASCII encoded hexadecimal format. All alpha characters must be upper case. These two characters are together converted to a single binary value (convert_to_binary( ) representing the target position which is returned in the variable target to main( ).

Case 'g': This case is identical to the first case ('G') with the exception that, since the first character is lower case, all of the slaves in the system are requested to move at low speed. The speed variable is set to low, (speed=LOW). Low speed allows the slaves to achieve the requested slat position in small imperceptible increments.

Case SLAVE_ID_U: This case is identical to the first case ('G') with the exception that, since the first character is identical to the slave identification for this slave (here the example is given as 'X') then this slave is the only one in the system that has been requested to move. Since the character is upper case, this slave is requested to move at high speed. The speed variable is set to high, (speed=HIGH).

Case SLAVE_ID_L: This case is identical to the third case (SLAVE_ID_U) with the exception that, since the first character is lower case, this slave is requested to move at low speed. The speed variable is set to low, (speed=LOW).

Case 'S': In this case the master is about to power down the slaves and is requesting they enter sleep mode (sleep( ) which is simply an infinite do nothing loop during which the slaves draw very little power.

DEFAULT: The default case occurs if none of the other cases is true and this indicates that a communications error has occurred. In this case the target is flagged as irrational (target=IRR) and is returned as such to main( )

Some examples of valid command strings are:

'U7F' Slave u is commanded to move quickly to the half way position.

'x00' Slave x is commanded to move slowly to the fully open position.

'GFF' All slaves are commanded to move quickly to the fully closed position.

receive_char( )

An example of a receive_char( ) algorithm incorporated in an embodiment of the present invention is as follows:

```
receive_char( )
{
    comm_byte = 255;                  /* Initialise the received data to an irrational value */
    start_timer( );                   /* Initialise the timer */
    WHILE(RXB == 0)                   /* Wait until the communications D/I input is high - start bit */
    {
      IF (timer > START_DELAY) exit;  /* We have waited too long for the start bit; exit */
    }
    start_timer( );                   /* Re-initialise the timer */
    WHILE(timer < HALF_BIT);          /* We have received the start bit, wait here for the first data bit */
    FOR( j=0; j<8; j++)               /* We can now coiled the data. We need to fetch 8 bits */
    {
      lo_bit = 0;                     /* Initialise the bit counters */
      hi_bit = 0;
      FOR(i=0; i< BIT_TIME; i++)      /*Read the comm D/I continually for the entire bit time */
        {
          IF(RXB == 1) hi_bit = hi_bit + 1;    /* Count the number of instances of high and low states for the comm D/I */
          ELSE lo_bit = lo_bit + 1;
        }
      IF       ( ( hi_bit/lo_bit) > NOISE_RATIO)        /* Is this a valid 1 bit? */
             comm_byte = (comm_byte OR 10000000b);      /* If so place a 1 in the received char MSB */
      ELSEIF  ( ( lo_bit/hi_bit) > NOISE_RATIO)         /* Is this a valid 0 bit? */
             comm_byte = (comm_byte AND 01111111b);     /* If so place a 0 in the received char MSB */
      ELSE return(255);                                 /* The transmission is too noisy so abort and return with an
irrational value */
```

```
    IF (j <> 7) comm_byte = comm_byte >> 1;      /* Shift the received bit one place to the right unless it is the last bit
received */
  } /* End of FOR loop */
  return(comm_byte);                              /* Successful reception of a byte of data, return it */
} /* End of receive_char( ) function */
```

This routine is called by the interrupt service routine (ISR( )) when a communications interrupt occurs. It is responsible for retrieving characters from the communications port which is a single digital input, for example, such as is shown in FIGS. 5, 6, 15, 17, and is herein defined as RXB. This algorithm is used by the slave, the master and the bus repeater to receive characters. The algorithm is created to retrieve weak and noisy signals. The routine first starts a timer and then waits until the start bit is at a high logic level (WHILE(RXB==0)). However, the routine will only wait for a pre-determined amount of time (here defined as the constant START_DELAY) and if the start bit has not been detected (RXB=1) by this time, the routine will simply exit. Once the start bit has been detected, a delay loop is entered (which has been calibrated by setting the value of the constant HALF_BIT) to wait until the beginning of the first data bit. The length of this delay is dictated by the baud rate used for the data communications. The routine then loops 8 times to detect the logic state of the next 8 data bits. For each bit, the following logic is performed:

- A second sub-loop is entered which is carefully timed according to the constant BIT_TIME. The length of real-time taken to complete the execution of this loop is a function of the constant BIT_TIME as well as the clock speed of the microprocessor and the instruction execution times of the instructions embedded within the loop. The loop continuously reads the state of the communications port, RXB and keeps a count of the number of times the input is high and the number of times it is low (lo_bit and hi_bit respectively).
- Once the loop has completed (the time period dictated by BIT_TIME has expired) a comparison of the low bit and high bit counts is performed by calculating a ratio (hi_bit/lo_bit and lo_bit/hi_bit). A perfect bit transmission would see one bit count possessing a high value and the other a zero value (e.g. the bit has been detected as a 1 bit for each and every read of RXB, no low states were detected). However, in a noisy environment or when the signal has been significantly attenuated there may be some ambiguity in the state of the data bit. For this reason a single read followed by a delay loop will not suffice. This algorithm utilizes the delays between bits dictated by a certain baud rate to perform continuous reads of the data bit and to calculate a signal to noise ratio.
- If the ratio of high bits detected to low bits detected is greater than a pre-determined ratio (here defined as NOISE_RATIO) then the data bit is determined to be a logic 1 and this bit is placed within the most significant bit position (comm_byte=(comm_byte OR 10000000b)) of the received data byte, (comm_byte).
- If the ratio of low bits detected to high bits detected is greater than a pre-determined ratio (here defined as NOISE_RATIO) then the data bit is determined to be a logic 0 and this bit is placed within the most significant bit position (comm_byte=(comm_byte AND 01111111b)) of the received data byte, (comm_byte).
- The bits within the received data byte (comm_byte) are shifted one position to the right to make way for the next data bit (comm_byte=comm_byte>>1) unless this is the 8th data bit in which case the current bit is already in the correct position.
- The received data byte (comm_byte) is returned to the calling routine.
- The length of time that the instructions take to execute is carefully calibrated by setting the value of BIT_TIME such that for a given baud rate, each execution of the loop is equivalent to the transmission time of a single bit. This algorithm allows for the reconstruction of data bits even when they are compromised in a noisy environment. This allows the system to transmit data over greater distances and in noisy environments.

open_blind(target)

An example of an open_blind(target) algorithm incorporated in an embodiment of the present invention is as follows:

```
open_blind(target)                               /* The position request (target) has been received and is less than the current
position, */
{                                                /* therefore the blinds must be opened to the correct position */
  current_position = read_position_sensor ( );   /* Check the current position by reading sensor A/D converter */
  IF (target < MAXOPEN) exit                     /* Not a valid target exit */
  IF ( current_position <= MAXOPEN) exit;        /* The blinds are already fully open, so exit */
  set_point = 1;                                 /* initialize the setpoint for the pulse open routine */
  stuck_count = 0;                               /* Initialize the error counts */
  bad_sensor_count = 0;
  WHILE (current_position > target)              /* The motor will be pulsed in the open direction until the target is
reached or an error occurs */
  {
    error = 0;                                   /* Clear the error code before pulsing */
    pulse_open(set_point);                       /* Pulse the motor in the open direction once */
    SWITCH(error)
    {
      CASE 0:
        stuck_count = 0;                         /* No errors on this pulse so clear the error counts */
        bad_sensor_count = 0;
        current_position = read_position_sensor ( ); /* Check the current position by reading sensor A/D converter */
        set_point = set_point + 1 ;              /* Increment the setpoint and pulse again until the target is achieved */
        break;                                   /* There were no errors so continue on to next pulse */
```

```
CASE STUCK:
  stuck_count = stuck count + 1;           /* Increment the STUCK error count */
  IF (stuck_count > 4)                     /* Has the motor been stuck four times in a row? */
  {
    flash(error);                          /* Yes, too many stuck errors, signal the error and exit */
    exit;
  }
ELSE
{
  energize_motor(CLOSING);                 /* Reverse the motor briefly to try and clear the sticking point */
  delay(REVERSE);                          /* Leave it on for a set time period */
  de_energize_motor( );                    /* Turn the motor off, clear the error and try again */
  error = 0;
}
break;
CASE BADSENSOR:
  bad_sensor_count = bad_sensor_count + 1; /* Increment the BADSENSOR error count */
  IF (bad_sensor_count > 4)                /* Has the motor gone in the wrong direction four times in a row? */
  {
    flash(error);                          /* Yes, too many errors, signal the error and exit */
    exit;
  }
ELSE
{
  error = 0;                               /* Clear the error and try again */
}
break;
CASE NOSENSOR:
  irr_position = analogue_to_digital_conversion(sensor_AI);  /* Fetch the raw analogue to digtial value for the sensor */
  IF (irr_position < SENSOR_MAX_LO)        /* Is it too low? Open too far? */
  {
    FOR (i=0; i<CREEP_TRIES; i++)
      {
        energize_motor(CLOSING);           /* Pulse the motor briefly to try and bring back inot the rational range */
        delay(CREEP);                      /* Leave it on for a set time period */
        de_energize_motor( );              /* Turn the motor off and check the position reading */
        position = analogue_to_digital_conversion(sensor_AI);  /* Fetch the raw analogue to digitial value for the sensor */
        IF(position >= SENSOR_MAX_LO)      /* Are we in the rational range yet? */
        {
          i = CREEP_TRIES;                 /* Yes - discontinue creeping */
          error = 0;                       /* and clear the error */
        }
        IF( (position - irr_position) > 3) /* Are we making any progress towards the rational range? */
        {
          i = 0;                           /* Yes - keep trying: re-start the loop by setting i = 0 */
          irr_position = position;         /* Store the current position */
        }
      } /* End of FOR loop */
  }
  ELSE IF (irr_position >SENSOR_MAX_HI)    /* Is it too high? Closed too far? */
  {
    FOR (i=0; i<CREEP_TRIES; i++)
      {
        energize_motor(OPENING);           /* Pulse the motor briefly to try and bring back inot the rational range */
        delay(CREEP);                      /* Leave it on for a set time period */
        de_energize_motor( );              /* Turn the motor off and check the position reading */
        position = analogue_to_digital_conversion(sensor_AI);  /* Fetch the raw analogue to digitial value for the sensor */
        IF(position < = SENSOR_MAX_HI)     /* Are we in the rational range yet? */
        {
          i = CREEP_TRIES;                 /* Yes - discontinue creeping */
          error = 0;                       /* and clear the error */
        }
        IF( (irr_position - position) > 3) /* Are we making any progress towards the rational range? */
        {
          i = 0;                           /* Yes - keep trying: re-start the loop by setting i = 0 */
          irr_position = position;         /* Store the current position */
        }
      } /* End of FOR loop */
  }
```

-continued

```
        ELSE    error = 0;                          /* Sensor position is right at the rational limit so clear the error and try
again */
      IF(error <> 0)                                /* If error is not equal to zero we were unsuccessful in
creeping back towards the rational range */
      {
        flash(error);                               /* Therefore, signal the error and exit */
        exit;
      }
    break;
  } /* End of SWITCH */
  delay(speed);                                     /* Delay between pulses dpending on high or tow speed
command */
  } /* End of WHILE loop */
} /* End of Function */
```

This routine is called from the program mainline and is passed the target position which has been received from the master command string. This algorithm operates on a modified pulse width modulation principle. Rather than attempting to move the slats to the requested angle in a single motion, the operation is broken into a series of small pulses whereby the motor is actuated for only a short period of time. Following each pulse, a delay loop is entered which does nothing but controls the time period between pulses and thus the overall speed of motion. Two speeds have been defined, high and low and the delay value is set in the variable speed. Any number of speeds could be defined and implemented simply by setting the length of the delay loop. The delay loop (delay(speed)) comes after each motor pulse.

The routine begins by reading the current position of the blinds through a call to read_position_sensor( ). If the blinds are already in the fully open position or if the target position exceeds the fully open position the routine will do nothing and simply exits. Next, the error counts (bad_sensor_count and stuck_count) are initialised to zero and the setpoint is initialised to 1. The main loop is entered and will execute until the current position of the slats is equal to or is less than the target position. (WHILE(current_position>target).) The setpoint starts at a value of 1 and is incremented after each pulse. In an ideal system, the pulse( ) routine would actuate the motor for a very brief period of time and the blinds would open by exactly one digital count each time the pulse( ) routine is called. However, this rarely occurs due to the physical nature of COTS blinds and shutters. On occasion, due to backlash and spring-like characteristics of the system, the position may actually be seen to be moving towards the close position after a pulse. On some occasions the pulse( ) routine will determine that the slat angle has reached the setpoint, but, once the motor has been de-energized the blinds will spring back towards the closed position. However, since the setpoint is incremented after each pulse, the algorithm functions as a position error integrator and the length of time the pulse( ) routine must actuate the motor will steadily increase until the setpoint is reached or exceeded. In this manner the motor will steadily progress the blinds to the desired slat angle. The pulse( ) routine can return a suite of errors:

STUCK: A count is kept of the number of times that this error has occurred without an intermediate error free pulse. The system will tolerate a stuck blind or shutter but if it occurs four times in a row the system will deem this an insurmountable failure and will signal the error by flashing an LED on the slave circuit board with the associated error code (flash(error)). The routine will then exit. If this error has not occurred four times in a row, an attempt is made to rectify the situation. The motor is actuated directly for a brief period of time (defined here by the constant REVERSE) but in the opposite direction. That is, the slat angle is backed up towards the closed position. This has the effect of moving the blind away from the stuck position in the hopes that the motor will be able to overcome the sticking once it has been energized and running freely for a period of time. (i.e. 'taking a run at it'). Secondly, by backing the slat angle up, the intrinsic position error integrator will contain a larger error and the pulse( ) routine will be required to energize the motor for a longer period of time to reach the current setpoint. (That is, the distance_moved calculated by the pulse ( ) routine will now appear smaller although the setpoint has remained the same.) The error code is reset to zero.

NOSENSOR: If the pulse( ) routine has determined that that the position sensor is reading outside of the rational range, this routine will attempt to 'nudge' the slat angle back into the rational range through a series of small creeping pulses. First the actual reading of the position sensor voltage is read directly through a call to the routine analogue_to_digital_conversion(sensor_AI). This routine directly reads the voltage developed by the position sensor circuit shown, for example, such as is shown in FIG. 19, and converts it to a digital value representing angular position. The routine checks this position to determine if the slats are too far closed or too far open. This determines in which direction the motor needs to turn in order to nudge the position sensor back into the rational range. (If the angular position is right at the limit of rationality, the error code is simply reset to zero and the routine tries again.) By entering a loop (FOR(i=0; i<CREEP_TRIES; i++), a number of attempts will be made to nudge the position sensor into the rational range. The motor is actuated in the appropriate direction for a brief period (here defined by the constant CREEP) and then de-energized. The position sensor voltage is then read again and if it is now reading in the rational range the error code is reset to zero and the loop is exited as the routine has successfully rectified the error. Otherwise a check is made to determine if the slat angle is progressing at all in the intended direction (IF((position−irr_position) >3)). If so, the loop counter is re-initialised since progress is being made and the effort is worth continuing. Therefore if five attempts in a row have been made at creeping towards the rational position but no reasonable progress has been made, the error code will remain set to NOSENSOR. The system will then deem this an insurmountable failure and will signal the error by flashing an LED on the slave circuit board with the associated error code (flash(error)). The routine will then exit.

BADSENSOR: A count is kept of the number of times that this error has occurred without an intermediate error free pulse. If this error has occurred four times in a row the system will deem this an insurmountable failure and will signal the error by flashing an LED on the slave circuit board with the associated error code (flash(error)). The routine will then exit. If this error has not occurred four times in a row, the routine will simply reset the error code to zero and try again.

pulse_open(set_point)

An example of a pulse_open(set_point) algorithm incorporated in an embodiment of the present invention is as follows:

```
pulse_open(set_point)
{
  start_timer( );                                    /* Initialize the timer */
  energize_motor(OPENING);                           /* Energize the motor in the open direction */
  distance_moved = 0;                                /* Initialize the distance moved so far this pulse */
  WHILE(distance_moved < set_point)                  /* The motor will remain energized until we reach the setpoint or an error occurs*/
  {
    IF (timer > PW)                                  /* Check the timer. Has the motor been energized longer than the maximum
allowable? */
    {
      error = STUCK;                                 /* Yes it has: set the error code and exit */
      de_energize_motor( );                          /* Turn motor off */
      exit;
    }
    current_position = read_position_sensor ( );     /* Check the current position by reading sensor A/D converter */
    IF (current_position == IRR) THEN                /* Is the sensor reading irrational */
    {
      error = NOSENSOR;                              /* Yes it is, there is no sensor connected: Set the error code and exit */
      de_energize_motor( );                          /* Turn motor off */
      exit;
    }
    distance_moved = last_position − current_position;                /*Determine how much we have moved */
    IF (distance_moved < 0) AND (absolute_value(distance moved) > 8) THEN  /* Have we moved in the wrong direction by more
than */
    {                                                /* 8 counts? */
      error = BADSENSOR;                             /* Yes: set error code and exit */
      de_energize_motor( );                          /* Turn motor off */
      exit;
    }
  } /* End of WHILE LOOP */
  de_energize_motor( );                              /* Turn motor off */
  exit;                                              /* We have moved to the desired setpoint without errors: return with error codes
clear */
} /* End of Function */
```

This routine will turn on the motor for a brief period of time (pulse) in order to open the blinds a small amount given by the passed variable set_point. The routine first starts a timer as the motor is only permitted to be energized for a maximum period as defined by the constant PW (Pulse Width) following which the motor is turned on through a call to energize_motor( ). The routine then enters a loop during which the current position of the slats is monitored continuously through successive calls to read_position_sensor( ). The distance moved during the motor pulse is given by distance_moved=last_position−current_position. (last_position was determined by the mainline of the program by reading the position sensor before a move was requested.) As soon as the distance moved reaches the value contained in the variable set_point the motor will be turned off through a call to de_energize_motor( ) and the routine will exit. If this occurs the pulse was successful in reaching the setpoint and no errors occurred (error=0). However, several errors can occur during the pulse:

STUCK: If the allowed time period for the pulse (PW) has expired before the blind has opened by the amount given by the setpoint (distance_moved=set_point), the motor is deemed to be stuck. When this occurs, the error code is set to STUCK, the motor is de-energized and the routine exits.

NOSENSOR: The read_position_sensor( ) routine will return an irrational value (255) if the position sensor reading is outside the rational range. This may occur because no sensor is connected to the slave circuitry; because the sensor has malfunctioned; or because a previous motion has, in error, moved the slat angle too far, past the fully opened or fully closed position. When this error is detected the error code is set to NOSENSOR, the motor is de-energized and the routine exits.

BADSENSOR: If the calculated distance moved (distance_moved=last_position−current_position) is negative, the slat angle is moving in the wrong direction towards the closed position. This can often occur briefly because of backlash in the system or noise from the position sensor. However it cannot occur consistently and a check is performed to see if the slat angle has moved more than 8 digital counts in the wrong direction. If not the error is ignored and will be typically corrected as the motor remains energized and moving in the correct direction. However, if the slat angle has moved more than 8 digital counts in the wrong direction, an error has occurred which may be due to a malfunction in the circuitry, or the motor or position sensor may have been connected incorrectly. When this error is detected the error code is set to BADSENSOR, the motor is de-energized and the routine exits.

open_blind and pulse_open

These algorithms have been developed as a means to precisely control hardware which is much less than perfect. That is, it is sticky, it acts like a spring and the torque requirements are very non-linear and change rapidly from location to location. Trying to gently move the blinds to the desired position in small imperceptible steps is quite difficult. Many problems occur with traditional and simple proportional algorithms: oscillations are the most serious read_position_sensor( )

An example of a read_position_sensor( ) algorithm incorporated in an embodiment of the present invention is as follows:

```
read_position_sensor ( )
{
  position = analogue_to_digital_conversion(sensor_AI);   /* Convert the position potentiometer voltage to a digital value */
  IF (position > SENSOR_MAX_HI) return(255);              /* If the sensor reading is outside the rational range, flag it with a value
of 255 */
  IF (position < SENSOR_MAX_LO) return(255);
  return(position);                                       /* Otherwise just return the value */
}
``` consequence. Over-powering the motors to always achieve the desired position is also undesirable because of the noise created. The algorithms were developed in a trial and error method and they succeed in switching the minimum amount of power to the motors while always achieving the requested position. The error detection algorithms are also essential when using COTS equipment as a single failure of one slave could bring down the entire system and place it in an unrecoverable mode. As a result of the error detection and remedial methods utilized by the master, most errors can be overcome. Errors that cannot be overcome will not place the system in an unsafe situation where current draw is continuous and potentially dangerous, causing destruction of individual circuit components and complete failure of the The position sensor voltage is read directly through a call to the routine analogue_to_digital_conversion(sensor_AI). This routine directly reads the voltage developed by the position sensor circuit, for example, such as is shown in FIG. 19, and converts it to a digital value representing angular position. The routine checks this position to determine if it is outside the limits of rationality and if so will return a position value of 255 (IRR). Otherwise the routine returns the digital value for angular position.

energize_motor(direction)

An example of an energize_motor(direction) algorithm incorporated in an embodiment of the present invention is as follows:

```
energize_motor(direction)          /* This routine puts two of the D/O's (specified by direction) in the motor drive
circuit in the active state */
{
IF (direction == OPENING)
  {
  clear_DO(CLOSE);                 /* Make sure other direction is turned off, put CLOSE D/O in the low state */
  set_DO(NCLOSE);                  /* Make sure other direction is turned off, put NCLOSE D/O in the high state */
  set_DO(OPEN);              /* Turn on open direction, put OPEN D/O in the high state */
  clear_DO(NOPEN);                 /* Turn on open direction, put NOPEN D/O in the low state */
  }
ELSE
  {
  clear_DO(OPEN);                  /* Make sure other direction is turned off, put OPEN D/O in the low state */
  set_DO(NOPEN);                   /* Make sure other direction is turned off, put NOPEN D/O in the high state */
  set_DO(CLOSE);                   /* Turn on close direction, put CLOSE D/O in the high state */
  clear_DO(NCLOSE);                /* Turn on close direction, put NCLOSE D/O in the low state */
  }
}
``` system. For example, a failed position sensor or an improperly installed position sensor will not cause the system to destroy itself; rather this will be detected and the system will be placed in a safe mode and the error reported: thus the system can be easily serviced at low cost.

close_blind and pulse_close

These routines are opposite and parallel to open_blind and pulse_open as described above, and perform substantially the same functions but in the opposite direction.

set timer( )

An example of a set_timer( ) algorithm incorporated in an embodiment of the present invention is as follows:

```
    start_timer( )
    {
    timer = 0;              /* Reset the timer */
    }
```

This routine actuates the motor drive circuit, for example, such as is shown in FIG. 18. If the variable received in direction is equal to OPENING then the digital output CLOSE is set to logic 0 and the digital output NCLOSE is set to logic 1 to ensure that the drive circuit is not energized for the other direction.

Subsequently, the digital output OPEN is set to logic 1 and the digital output NOPEN is set logic 0 and the motor will begin to turn in the open direction.

If the variable received in direction is equal to CLOSING then all of the aforementioned digital outputs are placed in the opposite logical state.

de_energize_motor( )

An example of a de_energize_motor( ) algorithm incorporated in an embodiment of the present invention is as follows:

```
de_energize_motor( )           /* This routine puts all of the D/O's in the motor drive circuit in the inactive state */
{
 clear_DO(OPEN);       /* Put OPEN D/O in the low state */
 set_DO(NOPEN);        /* Put NOPEN D/O in the high state */
 clear_DO(CLOSE);          /* Put CLOSE D/O in the low state */
 set_DO(NCLOSE);           /* Put NCLOSE D/O in the high state */
```

This routine places all of the digital outputs, for example such as is shown in FIG. 18, into a logic state such that neither the open nor the close segment of the motor drive circuit is actuated.

While the above description provides examples of one or more embodiments of the invention, it will be appreciated that other embodiments may be within the scope of the present description as interpreted by one of skill in the art.

The invention claimed is:

1. A system for controlling slat based window coverings to adjust admitted daylight, said system comprising:
   a master circuitry comprising a microcontroller;
   one or more blinds connected to a motor configured to operate as one or more slaves controlled by the master circuitry; and
   one or more sensors configured to detect sunlight intensity directed to an area proximal to at least one of the one or more blinds, and to communicate sunlight intensity data to the master circuitry,
   wherein the master circuitry is configured to cause the one or more slaves to adjust a position of at least one of the one or more blinds based on the sunlight intensity data, and
   wherein adjusting at least one of the one or more blinds comprises actuating one of the one or more slaves to apply a pulse to one or more of the at least one of the one or more blinds in a first direction,
   wherein the actuating comprises applying a sequence of pulses to the one of the at least one of the one or more blinds, wherein a duration of each of the pulses in the sequence of pulses is increased with each successive pulse;
   wherein the microcontroller is configured to utilize signals transmitted by the one or more slaves to determine that one or more of the one or more blinds is malfunctioning and to generate commands and transmit said commands to the slaves corresponding to the one or more malfunctioning blinds to correct said malfunction, and
   wherein the malfunctioning comprises the one or more of the one or more blinds being in a stuck condition, and wherein the commands to correct the malfunction comprise commands to apply a first number of pulses in a second direction opposite to the first direction, and then apply a second number of pulses in the first direction.

2. The system of claim 1, wherein the master circuitry is further configured to adjust the position of one or more of the one or more blinds in response to a user request provided to the master circuitry.

3. The system of claim 1, further comprising an external bus operable to receive external commands from an external controller and to communicate said external commands to the master circuitry, wherein the master circuitry is further configured to adjust the position of one or more blinds based on said external commands.

4. The system of claim 1, further comprising one or more position sensors for detecting one or more factors pertaining to the environment of the one or more blinds, said one or more position sensors being operable to transmit signals to the master circuitry, wherein the microcontroller is operable to interpret said signals and to control the one or more blinds in accordance with the interpreted signals.

5. The system of claim 1, wherein each of the one or more blinds comprises a motor incorporated within a headrail of said one of the one or more blinds, wherein said motor is operable to control the one of the one or more blinds as one of the one or more slaves in accordance with the control of the master circuitry.

6. The system of claim 1, further comprising a power and interface circuit connected to the master circuitry, wherein the power and interface circuit is operable to provide signals to the microcontroller, and wherein the microcontroller is operable to interpret said signals and to determine that a power outage is imminent.

7. The system of claim 1, wherein the master circuitry is further configured to determine one or more preferred positions of each blind over a period of time based on energy consumption guidelines, and wherein the master circuitry is further configured to cause the one or more slaves to position each blind in one or more of the preferred positions over the period of time.

8. The system of claim 1, wherein the master circuitry is further configured to generate a sleep mode and to control the one or more slave modules to function in said sleep mode.

9. The system of claim 1, wherein a mechanical resistance of the one of the one or more blinds is variable through the range of rotation of the one of the one or more blinds.

10. The system of claim 1, wherein each of the pulses is applied to a same one of the blinds.

11. The system of claim 1, wherein causing the one or more slaves to adjust at least one of the one or more blinds based on the sunlight intensity data comprises determining, by the master circuitry, a desired angle for at least one of the blinds, and wherein the sequence of pulses is applied until the at least one of the blinds is positioned at substantially the desired angle.

12. The system of claim 11, wherein the master circuitry is further configured to receive solar angular position data, and wherein the desired angle is determined based on the sunlight intensity data and the solar angular position data.

13. The system of claim 11, wherein the desired angle is determined based on the sunlight intensity data and user preference data.

14. The system of claim 13, wherein the user preference data comprises one or more preferred positions for one or more respective blinds.

15. A method for controlling slat based window coverings to adjust admitted daylight, the method comprising:
   detecting sunlight intensity directed to an area proximal to at least one of one or more blinds;
   transmitting the detected sunlight intensity data to a master circuitry, the master circuitry comprising a microcontroller;
   adjusting, by a motor configured to operate as one or more slaves controlled by the master circuitry, at least one of the one or more blinds, based on the sunlight intensity data;

transmitting signals to the microcontroller via the one or more slaves;

determining, by the microcontroller, that one or more of the one or more blinds is malfunctioning;

generating, by the microcontroller, commands to correct said malfunction; and transmitting said commands to correct said malfunction to the one or more slaves corresponding to the malfunctioning blinds, wherein the adjusting comprises actuating one or more of the one or more slaves to apply a pulse to the at least one of the one or more blinds in a first direction, wherein the actuating comprises applying a sequence of pulses to one of the at least one of the one or more blinds, wherein a duration of each of the pulses in the sequence of pulses is increased with each successive pulse; and wherein the malfunctioning comprises the one or more of the one or more blinds being in a stuck condition, and wherein correcting the malfunction comprises applying, to one of the one or more malfunctioning blinds, a first number of pulses in a second direction opposite to the first direction, and then applying a second number of pulses in the first direction.

16. The method of claim 15, wherein a mechanical resistance of the at least one or more blinds is variable through a range of rotation of the at least one of the one or more blinds.

17. The method of claim 15, wherein each pulse in the sequence of torque pulses is applied to a same one of the blinds.

18. The method of claim 15, further comprising:
receiving, by the master circuitry, a request to adjust the position of one or more blinds; and
adjusting the position of the one or more blinds in response to the request.

19. The method of claim 15, wherein the adjusting further comprises determining, by the microcontroller, a desired angle for at least one of the blinds, and wherein the sequence of pulses is applied until the at least one of the blinds is positioned at substantially the desired angle.

20. The method of claim 19, further comprising receiving solar angular position data, and wherein the desired angle is determined based on the sunlight intensity data and the solar angular position data.

21. The method of claim 15, further comprising:
detecting, by a position sensor, a current position of one of the one or more blinds; and
transmitting the current position to the microcontroller.

* * * * *